(12) United States Patent
Isaji et al.

(10) Patent No.: US 7,395,144 B2
(45) Date of Patent: Jul. 1, 2008

(54) BRAKE ASSISTING CONTROL SYSTEM USING A DISTANCE INDEX

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/805,236

(22) Filed: May 22, 2007

(65) Prior Publication Data

US 2007/0276574 A1    Nov. 29, 2007

(30) Foreign Application Priority Data

May 23, 2006  (JP)  ............................. 2006-143207
Aug. 24, 2006 (JP)  ............................. 2006-228373
Jan. 16, 2007  (JP)  ............................. 2007-007473

(51) Int. Cl.
     *B60T 8/32*  (2006.01)

(52) U.S. Cl. ............................. 701/70; 701/93; 701/94; 701/96; 701/301; 340/435; 340/436; 340/437; 180/170

(58) Field of Classification Search .................. 701/70, 701/96, 93–94, 301; 340/435–437, 522, 340/903; 180/170
See application file for complete search history.

(56) References Cited

U.S. PATENT DOCUMENTS

| | | | | | |
|---|---|---|---|---|---|
| 5,189,619 | A | * | 2/1993 | Adachi et al. | .................. 701/96 |
| 5,231,582 | A | * | 7/1993 | Takahashi et al. | .................. 701/56 |
| 5,572,449 | A | * | 11/1996 | Tang et al. | .................. 700/304 |
| 5,878,361 | A | * | 3/1999 | Sekine et al. | .................. 701/41 |
| 5,928,299 | A | * | 7/1999 | Sekine et al. | .................. 701/41 |
| 6,332,108 | B1 | * | 12/2001 | Hirasago | ..................... 701/93 |
| 6,393,361 | B1 | * | 5/2002 | Yano et al. | ................... 701/301 |
| 6,473,678 | B1 | * | 10/2002 | Satoh et al. | .................... 701/41 |
| 6,487,501 | B1 | * | 11/2002 | Jeon | .......................... 701/301 |
| 6,493,619 | B2 | * | 12/2002 | Kawazoe et al. | .............. 701/41 |
| 2002/0013647 | A1 | * | 1/2002 | Kawazoe et al. | .............. 701/41 |

(Continued)

FOREIGN PATENT DOCUMENTS

DE          10251038 A1 *  5/2004

(Continued)

OTHER PUBLICATIONS

Chauffeur Assistant: a driver assistance system for commercial vehicles based on fusion of advanced ACC and lane keeping, Fritz, H.; Gern, A.; Schiemenz, H.; Bonnet, C.; Intelligent Vehicles Symposium, 2004 IEEE, Jun. 14-17, 2004 pp. 495-500, Digital Object Identifier 10.1109/IVS.2004.1336433.*

(Continued)

*Primary Examiner*—Cuong H. Nguyen
(74) *Attorney, Agent, or Firm*—Harness, Dickey & Pierce, PLC

(57) ABSTRACT

An object of the invention is to provide a brake control system for a vehicle, according to which a comfortable feeling for a vehicle deceleration is obtained. An index of evaluating a vehicle distance change is calculated based on a relative vehicle speed, wherein the index has a characteristic feature according to which the index value is increased as the relative vehicle speed becomes higher and a vehicle distance becomes shorter. A brake assisting operation is carried out such that the index is controlled at a target value.

10 Claims, 9 Drawing Sheets

U.S. PATENT DOCUMENTS

2006/0100775 A1* 5/2006 Michi et al. .................. 701/200
2007/0021876 A1 1/2007 Isaji et al.
2007/0142996 A1* 6/2007 Lee ............................. 701/96

FOREIGN PATENT DOCUMENTS

| EP | 1603766 A1 | * | 12/2005 |
| JP | 04-121260 | | 4/1992 |
| JP | 11-334557 | | 12/1999 |
| JP | 2000326757 A | * | 11/2000 |
| JP | 2002-264687 | | 9/2002 |

OTHER PUBLICATIONS

Predicting driving speed using neural networks, Schroedl, S.; Wenbing Zhang; Intelligent Transportation Systems, 2003. Proceedings. 2003 IEEE, vol. 1, 2003 pp. 402-407 vol. 1, Digital Object Identifier 10.1109/ITSC.2003.1251985.*

Real-time recognition of large-scale driving patternsm, Engstrom, J.; Victor, T.; Intelligent Transportation Systems, 2001. Proceedings. 2001 IEEE, Aug. 25-29, 2001 pp. 1018-1023, Digital Object Identifier 10.1109/ITSC.2001.948801☐☐.*

Search Report dated Sep. 7, 2007 in European Application No. 07010165.4.

* cited by examiner

DIFFERENCE [dB] BETWEEN CORRECTED VALUE "KdB_c"
AND APPROXIMATE EXPRESSION FOR "KdB_c"

DIFFERENCE [dB] BETWEEN CORRECTED VALUE "KdB_c"
AND APPROXIMATE EXPRESSION FOR "KdB_c"

BRAKE ASSISTING CONTROL SYSTEM USING A DISTANCE INDEX

CROSS REFERENCE TO RELATED APPLICATION

This application is based on Japanese Patent Application Nos. 2006-143207 filed on May 23, 2006, 2006-228373 filed on Aug. 24, 2006, and 2007-007473 filed on Jan. 16, 2007, the disclosures of which are incorporated herein by reference.

FIELD OF THE INVENTION

The present invention relates to a brake control system for a vehicle.

BACKGROUND OF THE INVENTION

A brake control system for a vehicle is known in the prior art, for example, as disclosed in Japanese Patent Publication H4-121260. According to such a conventional brake control system (also referred to as the first conventional system), an operating speed of a brake pedal is detected, when a vehicle driver operates the brake pedal. And fluid pressure of braking fluid is rapidly increased to its maximum braking pressure, when the detected operating speed of the brake pedal is higher than a predetermined reference value. Namely, in the above first conventional system, whether it is an emergency braking operation or not is determined by the operating speed of the brake pedal. And a brake assisting control to the braking pressure is carried out so that the maximum braking pressure is generated when it is determined that there is the emergency braking operation.

Another brake control system for the vehicle is further known in the prior art, for example, as disclosed in Japanese Patent Publication H11-334557. According to such a conventional brake control system (also referred to as the second conventional system), a relative vehicle distance between a driver's vehicle and a front vehicle (or a front obstacle) is detected by, for example, a laser radar device. A target vehicle deceleration is calculated in order that the driver's vehicle can be stopped before reaching at the front vehicle (or the front obstacle), based on a relative vehicle speed (which corresponds to a rate of change of the relative vehicle distance) or a vehicle speed of the driver's vehicle. And a brake assisting control (a control of pressure increase) to the braking pressure is carried out so that an actual braking pressure is increased to a target braking pressure, which can realize the above target vehicle deceleration.

According to the above first conventional system, the emergency braking operation is simply determined based on the operating speed of the brake pedal. Therefore, the brake assisting control to the braking pressure is always carried out whenever the detected operating speed of the brake pedal is higher than the predetermined reference value, whether or not the vehicle is under the emergency braking operation, such as a situation in which the driver's vehicle is approaching closer to the front vehicle (or obstacle). On the other hand, the brake assisting control to the braking pressure is not carried out, when the vehicle driver can not rapidly operate the brake pedal even in the case of the emergency situation. As above, it is difficult to always carry out the appropriate brake assisting control to the braking pressure, in the case that the brake assisting control to the braking pressure is performed simply depending on the operating speed of the brake pedal.

According to the above second conventional system, it is possible to generate a necessary braking force in the emergency situation, because the brake assisting control to the braking pressure is carried out so that the actual braking pressure is increased to the target braking pressure (the target vehicle deceleration), with which the vehicle can be stopped before the front obstacle. However, if the brake assisting control (the pressure increase control) to the braking pressure was always carried out in order to achieve the target braking pressure so that the vehicle could be stopped before the front obstacle, an extremely high deceleration would be rapidly generated. Accordingly, a decelerating operation having a sense of security to the vehicle driver may not be realized in most cases.

SUMMARY OF THE INVENTION

The present invention is made in view of the above problems. It is an object of the present invention to provide a brake control system for a vehicle, according to which an assisting control is carried out to a braking pressure, such that the vehicle driver can feel comfortable decelerating operation having sense of security when the vehicle driver operates a brake pedal to decelerate the vehicle because it is approaching closer to the front obstacle.

According to a feature of the present invention, a brake control system for a vehicle has a braking device for applying braking force to respective vehicle wheels, a distance detecting device mounted in a vehicle for detecting a vehicle distance between the vehicle and a front obstacle, and an electronic control unit for controlling a braking operation by the braking device for the vehicle in accordance with input signals from various kinds of sensors, including the distance detecting device.

The electronic control unit has a detecting portion for detecting a relative vehicle speed of the vehicle to the front obstacle, and a first calculating portion for calculating an index for evaluating a change of the vehicle distance, the index indicating a condition of the vehicle distance to the front obstacle, the index being increased as the relative vehicle speed becomes larger, and the index having an increasing gradient which is increased as the vehicle distance to the front obstacle becomes shorter in each of the relative vehicle speed.

The electronic control unit further has a setting portion for setting a target value for the index, which is plotted on a line having an initial value corresponding to the index at a stating point of a braking operation carried out by a vehicle driver, the target value being increased as the vehicle distance to the front obstacle becomes shorter, with a constant gradient which is decided based on the index at the stating point of the braking operation.

The electronic control unit further has a second calculating portion for calculating a target value of a relative vehicle deceleration, based an actual current value of the relative vehicle speed and a target value of the relative vehicle speed, wherein the target value of the relative vehicle speed is calculated from the target value for the index.

The electronic control unit further has a control portion for carrying out a brake assisting control to the braking force generated by the braking device such that an actual relative vehicle deceleration is controlled at the target value of the relative vehicle deceleration.

According to another feature of the present invention, an electronic control unit for a brake control system for a vehicle has a detecting portion for detecting a relative vehicle speed of the vehicle to the front obstacle, and a first calculating portion for calculating an index for evaluating a change of the vehicle distance, the index indicating a condition of the vehicle distance to the front obstacle, the index being increased as the relative vehicle speed becomes larger, and the index having an increasing gradient which is increased as the vehicle distance to the front obstacle becomes shorter in each of the relative vehicle speed.

In addition, the electronic control unit has a target calculating portion for calculating a deceleration target based on a normal deceleration of the vehicle, the vehicle distance to the front obstacle, and the actual relative vehicle speed detected by the detecting portion, the deceleration target being an index indicating a starting timing for carrying out the control operation to the braking force by the braking device.

In addition, the electronic control unit has a determining portion for determining whether a current value of the index for evaluating the change of the vehicle distance calculated by the first calculating portion is larger than the deceleration target calculated by the target calculating portion.

In addition, the electronic control unit has a setting portion for setting a target value for the index for evaluating the change of the vehicle distance, which is plotted on a line having an initial value corresponding to the index at such a timing at which the current value of the index for evaluating the change of the vehicle distance is determined as being higher than the deceleration target, and the target value being increased as the vehicle distance to the front obstacle becomes shorter, with a constant gradient which is decided based on the index at the timing at which the current value of the index for evaluating the change of the vehicle distance is determined as being higher than the deceleration target.

In addition, the electronic control unit has a second calculating portion for calculating a target value of a relative vehicle deceleration, based an actual current value of the relative vehicle speed and a target value of the relative vehicle speed, wherein the target value of the relative vehicle speed is calculated from the target value for the index.

In addition, the electronic control unit has a control portion for carrying out the control operation to the braking force generated by the braking device such that an actual relative vehicle deceleration is controlled at the target value of the relative vehicle deceleration.

According to a further feature of the present invention, an electronic control unit for a brake control system for a vehicle has a detecting portion for detecting a relative vehicle speed of the vehicle to the front obstacle, and a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed.

In addition, the electronic control unit has a determining portion for determining whether the corrected index of the index for evaluating the change of the vehicle distance is larger than a predetermined threshold value.

In addition, the electronic control unit has a control portion for carrying out a brake control to the braking force generated by the braking device when the corrected index of the index for evaluating the change of the vehicle distance is larger than the predetermined threshold value.

According to a still further feature of the present invention, an electronic control unit for a brake control system for a vehicle has a detecting portion for detecting a relative vehicle speed of the vehicle to the front obstacle, and a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed.

In addition, the electronic control unit has a determining portion for determining whether the corrected index of the index for evaluating the change of the vehicle distance is larger than a predetermined threshold value.

In addition, the electronic control unit has a setting portion for setting a target value for the corrected index for evaluating the change of the vehicle distance, which is plotted on a line having the predetermined threshold value as an initial value, and the target value being increased as the vehicle distance to the front obstacle becomes shorter, with a constant gradient which is decided based on the corrected index at such a timing at which the corrected index of the index for evaluating the change of the vehicle distance is determined as being larger than the predetermined threshold value.

In addition, the electronic control unit has a second calculating portion for calculating a target value of a relative vehicle deceleration, based an actual current value of the relative vehicle speed and a target value of the relative vehicle speed, wherein the target value of the relative vehicle speed is calculated from the target value of the corrected index.

In addition, the electronic control unit has a control portion for carrying out a brake control to the braking force generated by the braking device such that an actual relative vehicle deceleration is controlled at the target value of the relative vehicle deceleration.

According to a still further feature of the present invention, an electronic control unit for a brake control system for a vehicle has a detecting portion for detecting a relative vehicle speed of the vehicle to the front obstacle, and a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed.

In addition, the electronic control unit has a determining portion for determining whether the corrected index of the index for evaluating the change of the vehicle distance is larger than a predetermined threshold value.

In addition, the electronic control unit has a setting portion for setting the predetermined threshold value as a target value for the corrected index for evaluating the change of the vehicle distance, when the corrected index of the index for evaluating the change of the vehicle distance is determined as being larger than the predetermined threshold value by the determining portion.

In addition, the electronic control unit has a second calculating portion for calculating a target value of a relative vehicle deceleration, based an actual current value of the relative vehicle speed and a target value of the relative vehicle speed, wherein the target value of the relative vehicle speed is calculated from the target value of the corrected index.

In addition, the electronic control unit has a control portion for carrying out a brake control to the braking force generated by the braking device such that an actual relative vehicle deceleration is controlled at the target value of the relative vehicle deceleration.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Embodiments of the present invention will be explained with reference to the drawings.

Figure 1:
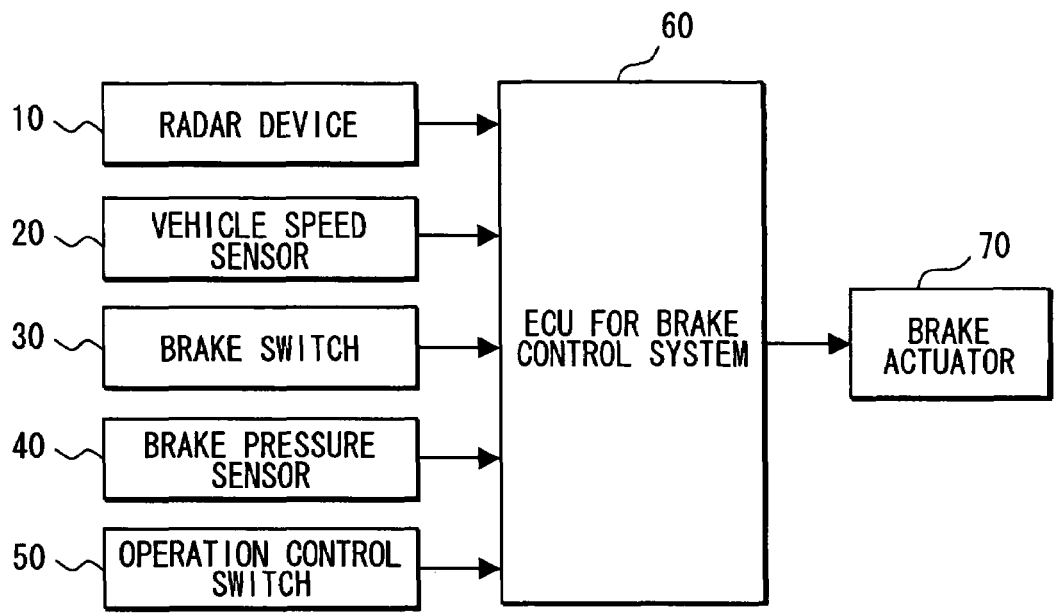
FIG. 1 is a block diagram showing a structure of a brake control system for a vehicle according to a first embodiment.

FIG. 1 shows a block diagram showing a structure of a brake control system for a vehicle. As shown in FIG. 1, the brake control system has a radar device 10, a vehicle speed sensor 20, a brake switch 30, a brake pressure sensor 40, an operation control switch 50, an electronic control unit (ECU) 60 for the brake control system, and a brake actuator 70.

The radar device 10 emits radar beams to a predetermined area in front of a driver's vehicle and receives reflected radar beams in order to detect a vehicle distance "D" between the driver's vehicle and a front obstacle (e.g. a front vehicle) as well as a relative position of the front obstacle with respect to the driver's vehicle. A relative vehicle speed "Vr" can be calculated by differentiating the vehicle distance "D" (detected by the radar device 10) by time. According to the embodiment, it is so defined that a minus sign (−) is given to the relative vehicle speed "Vr" when the driver's vehicle is approaching closer to the front vehicle, whereas a plus sign (+) is given to the relative vehicle speed "Vr" when the driver's vehicle is moving away from the front vehicle.

The vehicle speed sensor 20 detects a vehicle running speed of the driver's vehicle. When the relative vehicle speed "Vr" is calculated from the vehicle distance "D" detected by the radar device 10 and the vehicle running speed is detected by the vehicle speed sensor 20, a running speed of the front obstacle (i.e. a vehicle running speed of the front vehicle) can be obtained by a difference between the relative vehicle speed "Vr" and the vehicle running speed of the driver's vehicle.

The brake switch 30 detects a braking operation carried out by the vehicle driver to output an "ON" signal when a brake pedal is depressed (operated), or to output an "OFF" signal when the depressing stroke for the brake pedal is released.

The brake pressure sensor 40 detects pressure of brake fluid generated in a braking device (not shown), when the brake pedal is depressed by the vehicle driver. Then, a brake pad is pressed against a disc rotor fixed to a vehicle wheel at such a pressure corresponding to the pressure of the brake fluid, so that a braking force is generated to decelerate the vehicle. Therefore, a deceleration generated in the vehicle by the depression of the brake pedal can be presumed based on the pressure of the brake fluid produced by the pedal operation of the vehicle driver.

The operation control switch 50 is operated by the vehicle driver and its operation signal is inputted into the ECU 60 for the brake control system. The operation control switch 50 gives an instruction to the ECU 60 when the ECU 60 carries out a brake assisting control to the braking operation by the vehicle driver, so that a vehicle deceleration is controlled, for example, the vehicle is slowly or rapidly decelerated.

The brake actuator 70 regulates the pressure of the brake fluid in the braking device at a desired value in accordance with a command signal from the ECU 60.

The ECU 60 carries out the brake assisting control to the braking force generated by the braking device, based on inputted signals from the above various switches and sensors, when the vehicle driver operates the brake pedal in the case that the driver's vehicle is approaching closer to the front obstacle. The above brake assisting control is carried out such that a collision against the front obstacle is avoided and a comfortable feeling for the vehicle deceleration is obtained. According to the present embodiment, the brake assisting control is carried out by use of an index "KdB" of evaluating a vehicle distance change, which is an index for indicating a condition of a vehicle distance between the driver's vehicle and the front obstacle (vehicle). Accordingly, the index "KdB" of evaluating the vehicle distance change will be explained at first.

The vehicle driver assesses whether the driver's vehicle is approaching closer to the front vehicle or whether the driver's vehicle is moving away from the front vehicle, based on a visual change of dimensions of the front vehicle. Then, the vehicle driver controls the vehicle acceleration or deceleration by the operation of an acceleration pedal or the brake pedal. Accordingly, the index "KdB" of evaluating the vehicle distance change is calculated as an index for indicating the visual change of dimensions of the front vehicle. Therefore, the visual change of dimensions of the front vehicle, which is a criterion of judgment for the vehicle driver, is calculated as the index "KdB" for evaluating the vehicle distance change.

A visual area "S" (visual dimensions) of the front vehicle can be calculated by the following formula 1; wherein
H0: an actual height of the front vehicle;
W0: an actual width of the front vehicle;
S0: an actual area of the front vehicle (S0=H0×W0)
H: a height of an image of the front vehicle, which is reflected in the eyes of the vehicle driver;
W: a width of the image of the front vehicle;
S: an area of the image of the front vehicle;
D: a distance between eyes (lens of eyes) of the vehicle driver and the front vehicle; and
f: a focal distance of the eyes of the vehicle driver.

$$S = W \times H = W0 \times H0 \times (f/D)^2 \qquad \text{<Formula 1>}$$

Accordingly, a time-rate-of-change "dS/dt" for the visual area "S" of the front vehicle, which is reflected in the eyes of the vehicle drive, can be calculated by the following formula 2:

$$dS/dt = d(W \times H)/dt \propto d(f/D)^2/dt \propto d(1/D^2)/dt \qquad \text{<Formula 2>}$$

The time-rate-of-change "dS/dt" for the visual area "S" of the front vehicle can be indicated by the following formula 3, wherein a partial differentiation is performed in the above formula 2 with respect to the distance "D". And this is defined as a time-rate-of-change "K" for the area "S" of the front vehicle.

$$dS/dt \propto d(1/D^2)/dt = \{d(1/D^2)/dD\} \times (dD/dt) = (-2/D^3) \times Vr = K \qquad \text{<Formula 3>}$$

As above, the time-rate-of-change "K" for the area "S" of the front vehicle can be calculated based on the vehicle distance "D" between the driver's vehicle and the front vehicle and the relative vehicle speed "Vr", which is a time-rate-of-change of the vehicle distance "D".

The time-rate-of-change "K" for the area "S" of the front vehicle also indicates the time-rate-of-change "dS/dt" for the visual area "S" of the front vehicle. Therefore, the time-rate-of-change "K" is equal to a time-rate-of-change for the image of the front vehicle (for example, photographed by a camera) for a unit time. Accordingly, the time-rate-of-change "K" for the area "S" of the front vehicle can be alternatively calculated in the following manner, in which an imaging device (such as the camera) is installed in the vehicle and the time-rate-of-change "K" is calculated from the time-rate-of-change for the image of the front vehicle for the unit time.

The time-rate-of-change "K" for the area "S" of the front vehicle largely changes in a unit of $10^6$, when the vehicle distance is between 1 and 100 m. Therefore, the time-rate-of-change "K" is indicated in dB.

In connection with the indication of the time-rate-of-change "K" in dB, it is presumed that the time-rate-of-change "$K_0$" is a minimum area change which the vehicle driver can recognize as an area change. The time-rate-of-change "$K_0$" is such a time-rate-of-change "K" of the front vehicle, when the front vehicle is ahead of the driver's vehicle by 100 m and the driver's vehicle is approaching closer to the front vehicle with the relative vehicle speed of "Vr=−0.1 km/h". And it is defined that the value for the time-rate-of-change "$K_0$" of the above situation is "0[dB]". The time-rate-of-change "$K_0$" can be calculated by the following formula 4.

$$K_0 = (-2/D^3) \times Vr = (-2/100^3) \times (-0.1/3.6) \approx 5 \times 10^{-8} \qquad \text{<Formula 4>}$$

Namely, the value in dB is decided as "0[dB]", in the case that the time-rate-of-change for the area of the front vehicle is "$K_0 = 5 \times 10^{-8}$". And an index calculated by the following formula 5 is defined as the index "KdB" of evaluating the vehicle distance change. The value of "KdB" is a positive figure when the driver's vehicle is approaching closer to the front vehicle, whereas the value of "KdB" is a negative figure when the driver's vehicle is moving away from the front vehicle.

$$KdB = 10 \times \log(|K/(5 \times 10^{-8})|) = 10 \times \log\{|-2 \times Vr|/(D^3 \times 5 \times 10^{-8})\} \qquad \text{<Formula 5>}$$

Figure 2:
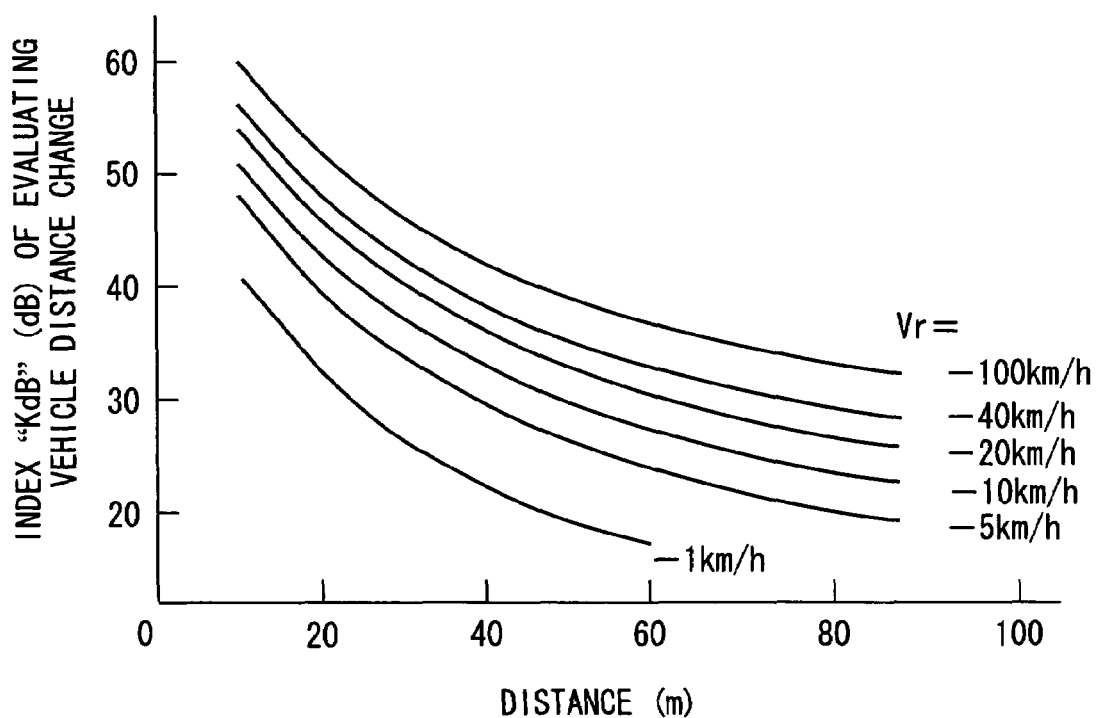
FIG. 2 is a graph showing a characteristic feature of change for an index "KdB" of evaluating a vehicle distance change.

FIG. 2 shows the index "KdB" of evaluating the vehicle distance change, which is defined by the formula 5 and which varies depending on the vehicle distance "D" and the relative vehicle speed "Vr" between the driver's vehicle and the front vehicle. As shown in FIG. 2, the index "KdB" of evaluating the vehicle distance change becomes larger as the relative vehicle speed "Vr" approaching closer to the front vehicle is higher, and an increasing gradient in each relative vehicle speed becomes larger as the vehicle distance "D" is shorter.

The brake assisting control to the braking force to be carried out by the ECU 60 will be explained with reference to the flow chart shown in FIG. 3.

The ECU 60 reads, at a step S100, input signals from the various sensors and switches 10 to 50. The ECU 60 determines at a step S110 whether the detected signal from the brake switch 30 is changed from the "OFF" signal to the "ON" signal. Namely, the ECU 60 determines at the step S110 whether the vehicle driver started the operation of the brake pedal.

In the case that the ECU 60 determines that the detected signal from the brake switch 30 is changed to the "ON" signal, the process goes to a step S120. A current value "KdB_p" for the index "KdB" of evaluating the vehicle distance change is calculated at the step S120. Namely, the current value "KdB_p" is calculated by substituting the values "D" and "Vr" in the above formula 5 with the vehicle distance "D" detected by the radar device 10 and the relative vehicle speed "Vr", which is the time-rate-of-change of the vehicle distance "D".

At a step S130 following the step S120, the ECU 60 calculates a target value "KdB_t" for the index "KdB" of evaluating the vehicle distance change. A method for calculating the target value "KdB_t" will be explained with reference to FIG. 4. At first, the current value "KdB_p" calculated at the step S120 is set as an initial value "KdB0". Then, a gradient "a" of the index "KdB" of evaluating the vehicle distance change, at such a time point at which the vehicle started with deceleration by the operation of the brake pedal, is calculated by differentiating the above current value "KdB_p" with respect to the distance "D".

The target value "KdB_t" for the index "KdB" of evaluating the vehicle distance change can be calculated by the following formula 6, namely based on the initial value "$KdB_0$", the gradient "a", the vehicle distance "$D_0$" at the time point of starting the vehicle deceleration, a "gain" which is changed by the operation control signal from the operation control switch 50, and the current vehicle distance "$D_p$" between the driver's vehicle and the front vehicle.

$$KdB\_t = \text{gain} \times a \times Dp + (a \times D_0 + KdB_0) \qquad \text{<Formula 6>}$$

Figure 4:
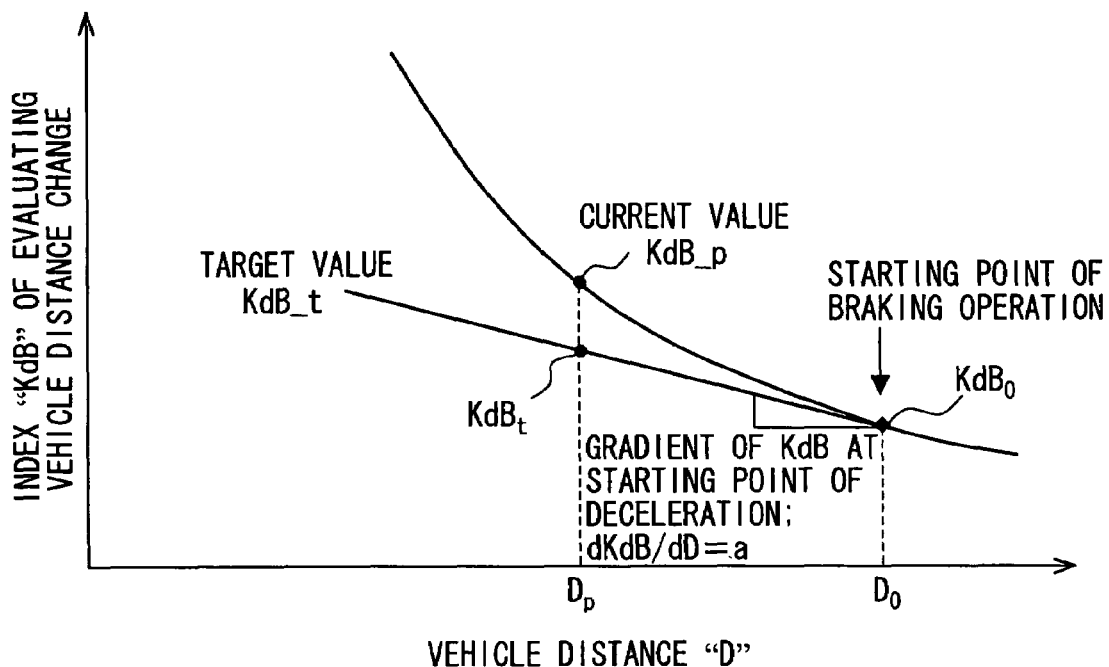
FIG. 4 is a graph explaining a method for calculating a target value "KdB_t" of the index "KdB" for evaluating the vehicle distance change.

Namely, the target value "KdB_t" for the index "KdB" of evaluating the vehicle distance change can be obtained as such a straight line, as shown in FIG. 4, wherein the straight line crosses the initial value "$KdB_0$" and the index "KdB" is increased with a constant gradient "a" from the initial value "$KdB_0$" as the vehicle distance "$D_p$" is decreased. The target value "KdB_t" at the current vehicle distance "$D_p$" can be calculated by substituting the current vehicle distance "$D_p$" into the above formula 6.

A value for the "gain", which is changed by the operation control signal from the operation control switch 50, is selected from a group, for example, "0.9", "1.0" and "1.1".

In the case that "1.0" is selected as the "gain", the gradient "a" is not changed. In the case that "0.9" is selected as the "gain", the gradient "a" is changed to a smaller side. Therefore, the relative vehicle speed "Vr" approaching closer to the front vehicle is decreased faster, as the vehicle distance "D" becomes shorter. As a result, the deceleration of the vehicle can be made larger. On the other hand, in the case that "1.1" is selected as the "gain", the gradient "a" is changed to a larger side. Accordingly, the deceleration of the vehicle can be made smaller.

As above, the deceleration of the vehicle can be controlled in the brake assisting control to the braking operation, by changing the gradient "a" which is multiplied by the "gain" selected by the vehicle driver. Accordingly, the decelerating operation of the vehicle can be adjusted depending on the preference of the vehicle driver.

Figure 3:
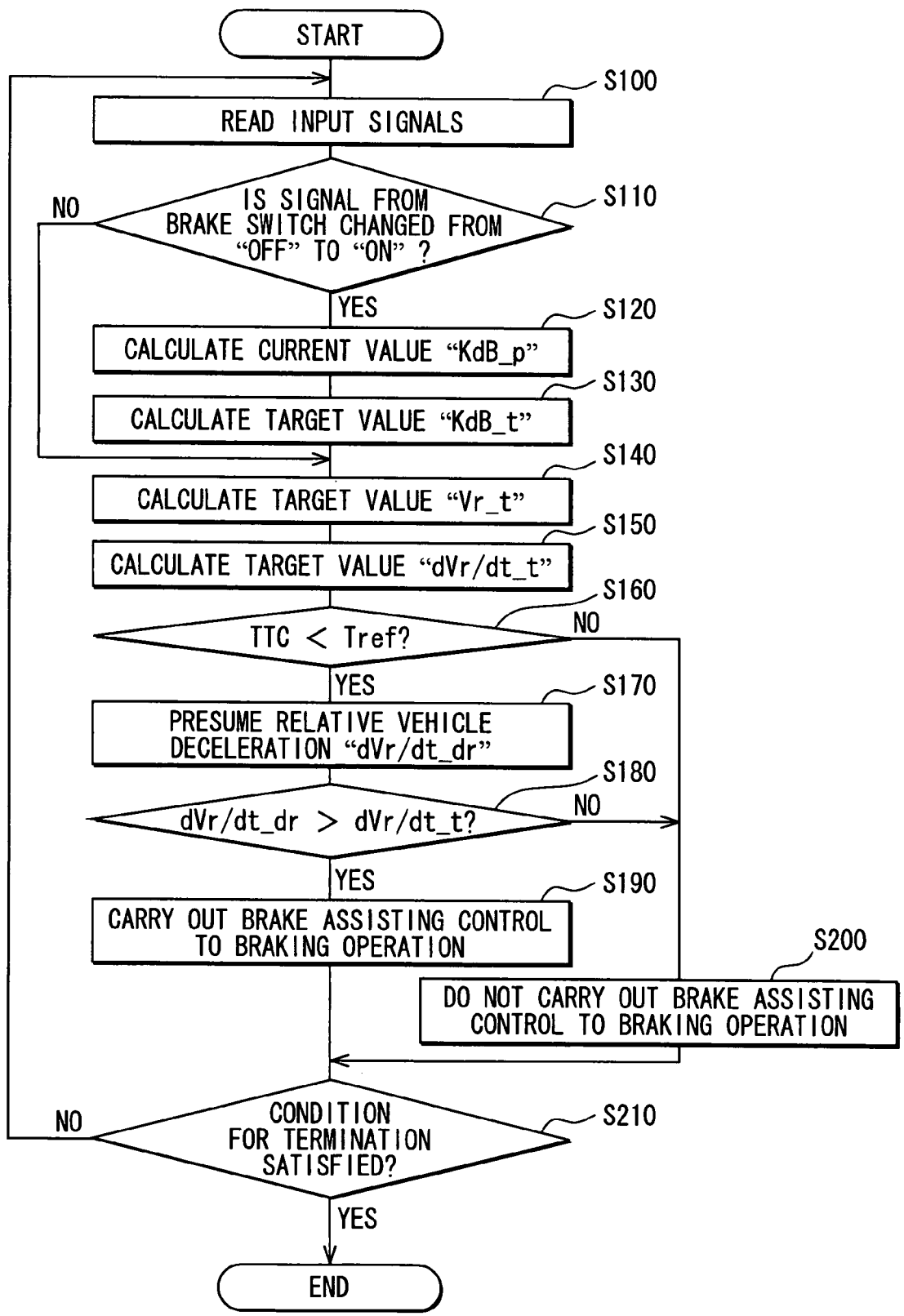
FIG. 3 is a flow chart for carrying out an assisting control to a braking force.

At a step S140 of FIG. 3, a target value "Vr_t" of the relative vehicle speed is calculated by the following formula 7, wherein the target value "KdB_t" calculated in the step S130 is used.

$$Vr\_t = -\tfrac{1}{2} \times 10^{(KdB\_t/10)} \times D^3 \times 5 \times 10^{-8} \qquad \text{<Formula 7>}$$

Namely, a curved line is supposed, as shown in FIG. 4, wherein the curved line crosses the initial value "$KdB_0$" and a current value "KdB_p" for the index "KdB" of evaluating the vehicle distance change at the current value "Dp" of the vehicle distance. And the target value "Vr_t" of the relative vehicle speed is calculated from the curved line supposed as above.

At a step S150, a target value "dVr/dt_t" for a relative vehicle deceleration is calculated by the following formula 8, wherein the current value "Vr_p" of the relative vehicle speed "Vr" and the target value "Vr_t" of the relative vehicle speed are substituted. The current value "Vr_p" of the relative vehicle speed is calculated by performing the differentiation of the current value "Dp" of the vehicle distance between the driver's vehicle and the front vehicle.

$$dVr/dt\_t = (Vr\_p - Vr\_t)/\Delta t \qquad \text{<Formula 8>}$$

In the above formula 8, $\Delta t$ is a divisor for converting a difference between the current value "Vr_p" and the target value "Vr_t" of the relative vehicle speed into the target value "dVr/dt_t" for the relative vehicle deceleration. The value for $\Delta t$ is appropriately selected.

At a step S160, the ECU 60 determines whether a collision tolerable time "TTC" is shorter than a predetermined time "Tref", wherein the collision tolerable time "TTC" is a remaining time until the driver's vehicle may possibly crash against the front vehicle. In the case that the collision tolerable time "TTC" is shorter than the predetermined time "Tref", the process goes on to a step S170. On the other hand, when the collision tolerable time "TTC" is longer than the predetermined time "Tref", the process goes to a step S200.

In the case that the collision tolerable time "TTC" is longer than the predetermined time "Tref", it corresponds to a situation that there is a sufficient time for the collision tolerable time "TTC" at starting the braking operation, so that the vehicle can easily avoid the collision against the front vehicle by a normal braking operation. Accordingly, at the step S200, the brake assisting control operation to the braking operation is not carried out.

At the step S170, a vehicle relative deceleration "dVr/dt_dr" of the driver's own vehicle is presumed based on the braking pressure generated by the driver's operation of the brake pedal. At a step S180, the ECU 60 determines whether the presumed value "dVr/dt_dr" for the vehicle relative deceleration (which corresponds to the driver's braking operation) is larger than a target value "dVr/dt_t" for the vehicle relative deceleration. The vehicle deceleration is indicated by a negative figure. Therefore, in the case that the presumed value "dVr/dt_dr" for the vehicle relative deceleration (which corresponds to the driver's braking operation) is larger than the target value "dVr/dt_t" for the vehicle relative deceleration, it means such a situation that the vehicle deceleration performed by the driver's braking operation is not enough high to decelerate the vehicle at the target value "dVr/dt_t" for the vehicle relative deceleration.

Accordingly, in the case that the determination at the step S180 is "YES", the process goes to a step S190 to carry out the brake assisting control to the braking operation. As a result, the brake assisting control to the braking operation is carried out when the collision tolerable time "TTC" (during which the vehicle may not crash against the front vehicle) is shorter than the predetermined time "Tref" and it is not possible to decelerate the vehicle at the target value "dVr/dt_t" for the vehicle relative deceleration by the braking operation of the vehicle driver.

In the brake assisting control to the braking operation to be carried out at the step S190, a braking pressure for generating the target value "dVr/dt_t" of the vehicle relative deceleration (which is calculated at the step S150) is obtained from a map prepared in advance, so that the brake actuator 70 is so controlled to generate such braking pressure. Alternatively, an actual deceleration of the vehicle may be detected to operate the brake actuator 70 to control the braking pressure, such that the actual deceleration meets the target value "dVr/dt_t" of the vehicle relative deceleration.

On the other hand, in the case that the ECU 60 determines at the step S180, that the presumed value "dVr/dt_dr" for the vehicle relative deceleration (which corresponds to the driver's braking operation) is smaller than the target value "dVr/dt_t" for the vehicle relative deceleration, it is possible to decelerate the vehicle by the driver's braking operation at such a deceleration which is higher than the target value "dVr/dt_t" of the vehicle relative deceleration. It is, therefore, not necessary to perform the brake assisting control to the braking operation, because the sufficient deceleration can be achieved simply by the driver's braking operation. Accordingly, the process goes to the step S200, at which no brake assisting control is carried out to the braking operation.

At a step S210, the ECU 60 determines whether a condition for terminating the brake assisting control to the braking operation is satisfied or not. The condition for terminating the process is satisfied, for example, when the driver's vehicle has stopped, when the collision tolerable time "TTC" becomes longer than the predetermined time "Tref" as a result that the front vehicle has accelerated, or when the index "KdB" of evaluating the vehicle distance change is decreased to become lower than the target value "KdB_t" by a predetermined amount. In the case that the condition for terminating the brake assisting control to the braking operation is not satisfied, the process is repeatedly carried out from the step S100.

As explained above, the brake assisting control is carried out to the braking operation in the above brake control system of the first embodiment. Now, when it is assumed that the relative vehicle speed "Vr" is constant, the index "KdB" of evaluating the vehicle distance change has a characteristic feature that the increasing gradient becomes larger as the vehicle distance "D" to the front vehicle is shorter. Accordingly, when the target value "KdB_t" for the index "KdB" of evaluating the vehicle distance change is calculated, wherein the increasing gradient is constant, the decreasing ratio of the relative vehicle speed "Vr" to the front vehicle is made larger as the vehicle distance "D" to the front vehicle becomes shorter.

As a result, the vehicle driver gets a comfortable feeling for the deceleration in the braking operation. It has been confirmed through experiments that the vehicle driver having a high skill in driving the vehicle performs the braking operation in the following manner. The increasing gradient of the index "KdB" of evaluating the vehicle distance change is maintained by the vehicle driver at such a value which is the value when the braking operation has started, so that an appropriate vehicle distance to the front vehicle is maintained.

The increasing gradient "a", which is used for calculating the target value "KdB_t" for the index "KdB" of evaluating the vehicle distance change, varies depending on the vehicle distance "$D_0$" to the front vehicle when the braking operation starts. As a result, the target value "KdB_t" for the index "KdB" of evaluating the vehicle distance change is appropriately calculated depending the vehicle distance "D" to the front vehicle and the relative vehicle speed "Vr", so that the vehicle is decelerated to avoid the crash against the front vehicle.

(First Modification)

Figure 5:
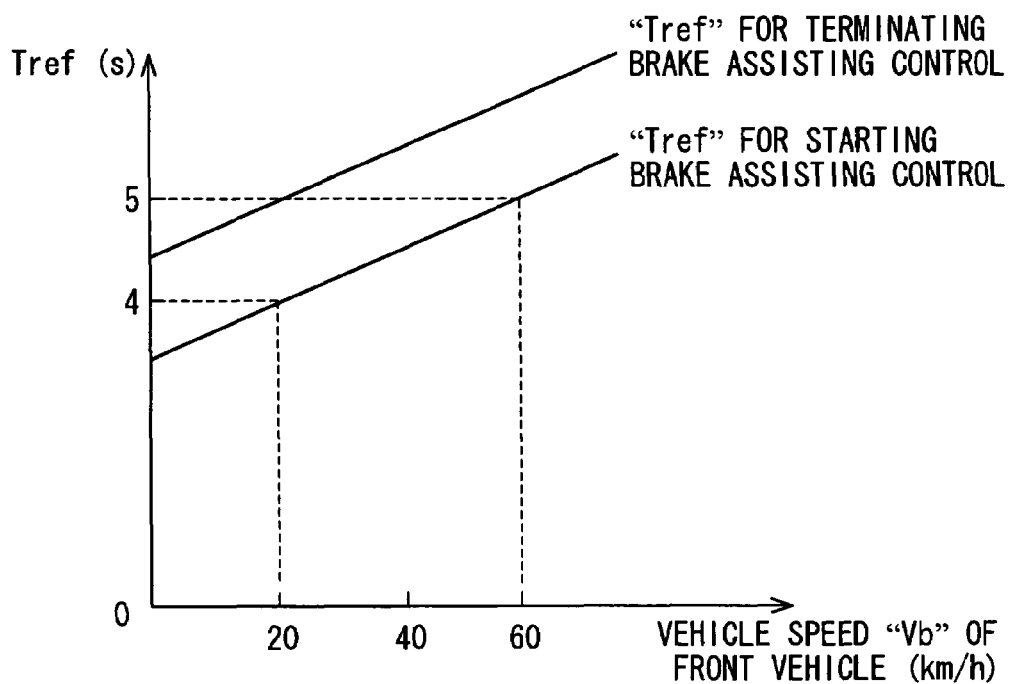
FIG. 5 is a graph showing an example for a method of setting a predetermined time "Tref" to be compared with a collision tolerable time "TTC"

In the above embodiment, the collision tolerable time "TTC" is compared with the predetermined time "Tref", and the brake assisting control is carried out when the collision tolerable time "TTC" is shorter than the predetermined time "Tref". However, the predetermined time "Tref" may be changed depending on a vehicle speed "Vb" of the front vehicle, as shown in FIG. 5. Namely, the predetermined time "Tref" is made longer as the vehicle speed "Vb" of the front vehicle is higher. According to such a modification, an appropriate braking force is generated in the braking operation of the present invention, even when the front vehicle is rapidly decelerated.

As shown in FIG. 5, a level (a value) of the "Tref" for starting the brake assisting control is made different from a level (a value) of the "Tref" for terminating the brake assisting control, in the case that the value for the "Tref" is changed depending on the change of the vehicle speed "Vb" of the front vehicle. This is to prevent the determination of the ECU from repeatedly changing from "YES" to "NO", or vice versa, at the step S160, depending on the change of the vehicle speed "Vb" of the front vehicle.

(Second Modification)

In the above embodiment, the current value "KdB_p" for the index "KdB" of evaluating the vehicle distance change is calculated at the step S120, when the detected signal from the brake switch 30 is changed from "OFF" to "ON" at the step S110, namely when the vehicle driver starts the braking operation. In addition to the braking operation by depressing the brake pedal, there are other operations performed by the vehicle driver for decelerating the vehicle, for example, an acceleration-pedal-off operation in which a pedal stroke for depressing an acceleration pedal is decreased, an operation for a gear shift in which a position of a shift lever is changed so that an engine brake is generated, and so on.

Accordingly, the ECU may determine at the step S110 of FIG. 3 whether or not any operation for decelerating the vehicle has been started, based on the detection for the acceleration-pedal-off operation or the gear shift operation, other than the braking operation by the brake pedal. In such a case, the vehicle deceleration, which will be caused by the acceleration-pedal-off operation or the gear shift operation, may be presumed at the step S170 of FIG. 3 based on the vehicle speed, the shit position (a speed reduction ratio of a transmission), and so on.

Second Embodiment

In the above first embodiment, the target value "KdB_t" for the index "KdB" of evaluating the vehicle distance change is calculated and set when the vehicle driver starts the braking operation. The target value "dVr/dt_t" for the relative vehicle deceleration is calculated based on the the target value "Vr_t" of the relative vehicle speed "Vr" obtained from the above target value "KdB_t" and based on the current value "Vr_p", of the relative vehicle speed "Vr". And the brake assisting control is carried out such that the actual vehicle deceleration is controlled at the target value "dVr/dt_t" for the relative vehicle deceleration.

A second embodiment differs from the first embodiment in the following points. A deceleration target is calculated based on the normal deceleration of the vehicle, the vehicle distance between the driver's vehicle and the front vehicle, and the actual relative vehicle speed. The deceleration target is an index indicating a starting point (a starting timing) for carrying out a control operation to the braking force of the brake control device. The target value "KdB_t" for the index "KdB" of evaluating the vehicle distance change is calculated and set when the current value "KdB_p" becomes higher than the deceleration target. An operation for controlling the braking force, which is carried out by the ECU 60 according to the second embodiment, will be explained with reference to the flowchart of FIG. 6.

According to the above first embodiment, the brake assisting control to the braking force is started only after the braking operation has been carried out by the vehicle driver. According to the second embodiment, however, the control operation to the braking force, in other words, a braking operation can be performed when a certain condition is satisfied, whether or not the braking operation has been actually carried out by the vehicle driver.

The ECU 60 reads, at a step S300, input signals from the various sensors and switches 10 to 50. The current value "KdB_p" for the index "KdB" of evaluating the vehicle distance change is calculated at a step S310. Namely, as in the same manner to the first embodiment, the current value "KdB_p" is calculated by substituting the values "D" and "Vr" in the above formula 5 with the vehicle distance "D" detected by the radar device 10 and the relative vehicle speed "Vr", which is the time-rate-of-change of the vehicle distance "D".

At a step S320, the ECU 60 calculates the deceleration target "KdB_ssdc", which is the index indicating the timing for carrying out the control operation to the braking force of the brake control device, based on the normal deceleration "nd" of the vehicle, the vehicle distance "D" between the driver's vehicle and the front vehicle, and the actual relative vehicle speed "Vr". The deceleration target "KdB_ssdc" is calculated in the following manner. At first the formula 5 is transformed to the following formula 9.

$$10^{(|KdB|/10)} = |-2 \times Vr|/(D^3 \times 5 \times 10^{-8}) \qquad \text{<Formula 9>}$$

The formula 9 can be further transformed to a formula 10, as below:

$$|-Vr| = (D^3 \times 5 \times 10^{-8}/2) \times 10^{(|KdB|/10)} = 2.5 \times D^3 \times 10^{\{(|KdB|/10)-8\}} \qquad \text{<Formula 10>}$$

Then, the following formula 11 is obtained by differentiating the above formula 10.

$$(dVr/dD) \times (dD/dt) = 7.5 \times D^2 \times 10^{\{(|KdB|/10)-8\}} \times Vr \qquad \text{<Formula 11>}$$

Since the above formula 11 represents the deceleration, the normal deceleration "nd" of the vehicle and the deceleration target "KdB_ssdc" are calculated in the following formula 12, wherein "nd" is a normal deceleration of the vehicle generated by the normal braking operation carried out by the vehicle driver.

$$nd = 7.5 \times D^2 \times 10^{\{(|KdB\_ssdc|/10)-8\}} \times Vr \qquad \text{<Formula 12>}$$

The above formula 12 is transformed to the following formula 13.

$$10^{\{(|KdB\_ssdc|/10)-8\}} = nd/7.5 \times D^2 \times Vr \qquad \text{<Formula 13>}$$

When the above formula 13 is expressed in a logarithm, the deceleration target "KdB_ssdc" is transformed to the following formula 14.

$$KdB\_ssdc = \{\log(|nd/(7.5 \times D^2 \times Vr)|) + 8\} \times 10 \qquad \text{<Formula 14>}$$

In the above formula 14, "nd" represents the normal deceleration of the vehicle generated by the normal braking operation carried by the vehicle driver. However, a deceleration generated in the vehicle by the engine brake may be used in place of "nd".

Figure 6:
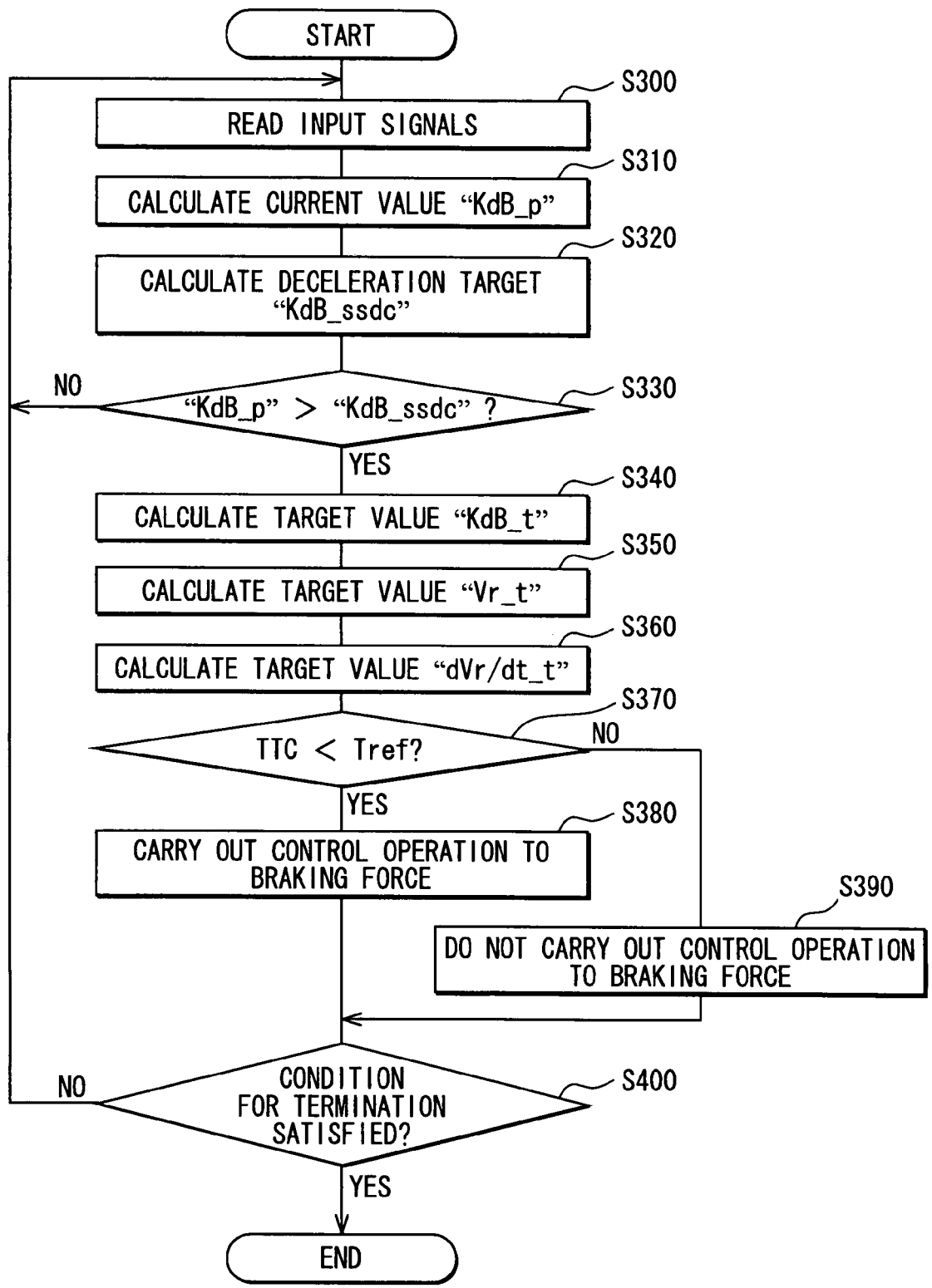
FIG. 6 is a flowchart for a braking force control according to a second embodiment.

At a step S330 of FIG. 6, the ECU 60 determines whether the current value "KdB_p" for the index "KdB" of evaluating the vehicle distance change is larger than the deceleration target "KdB_ssdc". In the case that the current value "KdB_p" is larger than the deceleration target "KdB_ssdc", the process goes to a step S340 in order to start the control operation for the braking force. On the other hand, when the current value "KdB_p" is smaller than the deceleration target "KdB_ssdc", the process goes to a step S300 to repeat the above steps S300 to S330.

As above, the deceleration target "KdB_ssdc" is calculated based on the normal deceleration "nd" of the vehicle, and the control operation to the braking force is started when the current value "KdB_p" of the index "KdB" becomes larger than the deceleration target "KdB_ssdc". As a result, the control operation to the braking force can be started at such a timing, at which the vehicle driver would usually start any operation for decelerating the vehicle speed, even in the case the vehicle driver does not actually start the operation for the vehicle deceleration.

At a step S340, the target value "KdB_t" for the index "KdB" of evaluating the vehicle distance change is calculated. The method for calculating the target value "KdB_t" is the same to that in the first embodiment, which is explained with reference to FIG. 4. Namely, according to the step S340, the target value "KdB_t" for the index "KdB" of evaluating the vehicle distance change is set such that the target value "KdB_t" is increased with a constant gradient as the distance to the front vehicle becomes shorter. Accordingly, the vehicle can be decelerated in such a manner that the decreasing ratio of the relative vehicle speed "Vr" to the front vehicle is made larger as the vehicle distance "D" to the front vehicle becomes shorter. As a result, the vehicle driver gets a comfortable decelerating feeling.

At a step S350, the target value "Vr_t" of the relative vehicle speed is calculated by the following formula 15, wherein the target value "KdB_t" calculated in the step S340 is used.

$$Vr\_t = -\tfrac{1}{2} \times 10^{(KdB\_t/10)} \times D^3 \times 5 \times 10^{-8} \qquad \text{<Formula 15=Formula 7>}$$

Namely, the curved line is supposed, as shown in FIG. 4, wherein the curved line crosses the initial value "KdB_0" and the current value "KdB_p" for the index "KdB" of evaluating the vehicle distance change at the current value "Dp" of the vehicle distance. And the target value "Vr_t" of the relative vehicle speed is calculated from the curved line supposed as above.

At a step S360, the target value "dVr/dt_t" for the relative vehicle deceleration is calculated by the following formula 16, wherein the current value "Vr_p" of the relative vehicle speed "Vr" and the target value "Vr_t" of the relative vehicle speed are substituted. The current value "Vr_p" of the relative vehicle speed is calculated by performing the differentiation of the current value "Dp" of the vehicle distance between the driver's vehicle and the front vehicle.

$$dVr/dt\_t = (Vr\_p - Vr\_t)/\Delta t \qquad \text{<Formula 16=Formula 8>}$$

In the above formula 16, $\Delta t$ is a divisor for converting a difference between the current value "Vr_p" and the target value "Vr_t" of the relative vehicle speed into the target value "dVr/dt_t" for the relative vehicle deceleration. The value for $\Delta t$ is appropriately selected.

At a step S370, the ECU 60 determines whether the collision tolerable time "TTC" is shorter than the predetermined time "Tref", wherein the collision tolerable time "TTC" is the remaining time until the driver's vehicle may possibly crash against the front vehicle. In the case that the collision tolerable time "TTC" is shorter than the predetermined time "Tref", the process goes on to a step S380. On the other hand, when the collision tolerable time "TTC" is longer than the predetermined time "Tref", the process goes to a step S390.

In the case that the collision tolerable time "TTC" is longer than the predetermined time "Tref", it is regarded that there is a sufficient time for the vehicle driver to avoid the collision against the front vehicle, at the time of the step S330 at which the ECU determined that the current value "KdB_p" is larger than the deceleration target "KdB_ssdc". Accordingly, at the step S390, the control operation to the braking operation is not carried out.

At the step S380, the control operation to the braking operation is carried out. Namely, the control operation to the braking operation is carried out, when the collision tolerable time "TTC" (during which the vehicle may not crash against the front vehicle) is shorter than the predetermined time "Tref" and it is not possible to decelerate the vehicle at the target value "dVr/dt_t" for the vehicle relative deceleration by the braking operation of the vehicle driver.

In the control operation to the braking force to be carried out at the step S380, the braking pressure for generating the target value "dVr/dt_t" of the vehicle relative deceleration (which is calculated at the step S360) is obtained from a map prepared in advance, so that the brake actuator 70 is so controlled to generate such braking pressure. Alternatively, an actual deceleration of the vehicle may be detected to operate the brake actuator 70 to control the braking pressure, such that the actual deceleration meets the target value "dVr/dt_t" of the vehicle relative deceleration.

At a step S400, the ECU 60 determines whether a condition for terminating the control operation to the braking force is satisfied or not. The condition for terminating the process is satisfied, for example, when the driver's vehicle has stopped, when the collision tolerable time "TTC" becomes longer than the predetermined time "Tref" as a result that the front vehicle has accelerated, or when the current value "KdB_p" for the index "KdB" of evaluating the vehicle distance change is decreased to become lower than the target value "KdB_t" by a predetermined amount. In the case that the condition for terminating the control operation to the braking force is not satisfied, the process is repeatedly carried out from the step S300.

According to the brake control system of the above embodiment, the above explained control operation to the braking force is carried out. Namely, in the case that the vehicle is approaching closer to the front vehicle, the control operation to the braking force can be started at such a timing, at which the vehicle driver would usually start any operation for decelerating the vehicle speed, even if the vehicle driver would not actually start the operation for the vehicle deceleration.

When the control operation to the braking force is started, the target value "KdB_t" for the index "KdB" of evaluating the vehicle distance change is set such that the target value "KdB_t" is increased with a constant gradient as the distance to the front vehicle becomes shorter. Accordingly, the vehicle can be decelerated in such a manner that the decreasing ratio of the relative vehicle speed "Vr" to the front vehicle is made larger as the vehicle distance "D" to the front vehicle becomes shorter. As a result, the vehicle driver gets a comfortable decelerating feeling.

(Third Modification)

In the above embodiments, the current value "KdB_p" for the index "KdB" of evaluating the vehicle distance change is calculated based on the vehicle distance "D" to the front vehicle and the relative vehicle speed "Vr", which is the time-rate-of-change of the vehicle distance "D". However, a vehicle speed "Vb" of the front vehicle is not taken into consideration for calculating the above current value "KdB_p". As a result, the timing for starting the control operation to the braking force may not match a degree of risk, which the vehicle driver feels.

Figure 7:
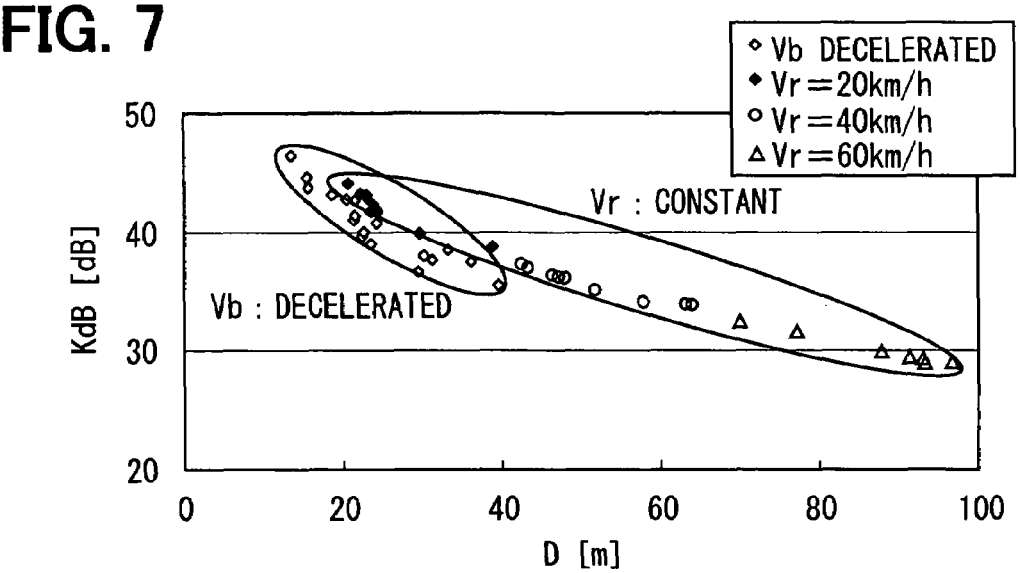
FIG. 7 is a graph showing the index "KdB" for evaluating the vehicle distance change at a starting point of a braking operation by a vehicle driver, and a vehicle distance "D" to a front vehicle, according to a third modification.

FIG. 7 shows the index "KdB" of evaluating the vehicle distance change at the timing of starting the braking operation by the vehicle driver, in the case that the driver's vehicle is approaching closer to the front vehicle, and the distance "D" to the front vehicle at such timing (starting the braking operation). As shown in FIG. 7, when the driver's vehicle is approaching closer to the front vehicle at a constant relative vehicle speed (e.g. "Vr"=20, 40, 60 km/h), there is a correlation between the relative vehicle speed "Vr" and the distance "D". There is, however, a different characteristic feature from the above case ("Vr" is constant), in the case that the front vehicle is decelerated from the vehicle speed "Vb".

This is because the vehicle driver feels a higher risk in the case that the driver's vehicle is approaching closer to the front vehicle as a result of the vehicle deceleration of the front vehicle, than in the case in which the driver's vehicle is likewise approaching closer to the front vehicle as a result of the vehicle acceleration of the driver's vehicle, even if the relative vehicle speed to the front vehicle is the same in each of the cases. Accordingly, it is preferable to start the control operation to the braking force (i.e. the operation of the vehicle deceleration) at an earlier timing, when the vehicle is approaching closer to the front vehicle and the vehicle driver feels a higher risk.

However, as described above, the index "KdB" of evaluating the vehicle distance change is calculated based on the vehicle distance "D" to the front vehicle and the relative vehicle speed "Vr". Therefore, the vehicle deceleration is started at the same timing, even in the case that the vehicle driver feels a higher risk. As a result, the timing for starting the control operation to the braking force (the vehicle deceleration) may not match the degree of risk, which the vehicle driver feels.

According to the third modification, therefore, a corrected value "KdB_c" for the index "KdB" of evaluating the vehicle distance change is used, wherein the vehicle speed "Vb" of the front vehicle is taken into consideration, as indicated in the following formula 17. In the formula 17, $\alpha$ is a coefficient smaller than 1.0, and it is confirmed that 0.3 is most appropriate for the value of $\alpha$.

$$KdB\_C = 10 \times \log\{|-2 \times (|Vr| + \alpha \times |Vb|)/(D^3 \times 5 \times 10^{-8})|\} \quad \text{<Formula 17>}$$

Figure 8:
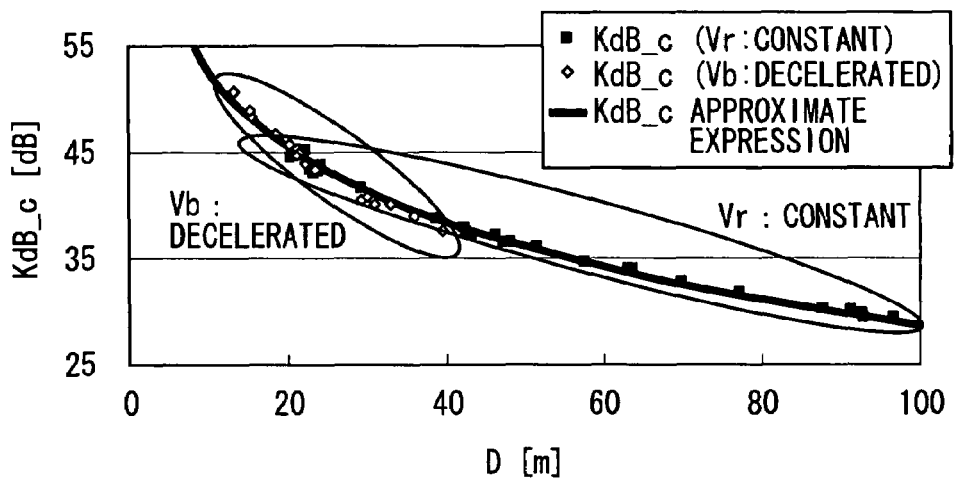
FIG. 8 is a graph, according to the third modification, showing a corrected value "KdB_c" for the index "KdB" of evaluating the vehicle distance change and the vehicle distance "D" to the front vehicle at the starting point of the braking operation, wherein the corrected values "KdB_c" are obtained from experiments in which a vehicle test driver was instructed to start the braking operation as late as possible but to avoid the crash against the front vehicle.
Figure 9:
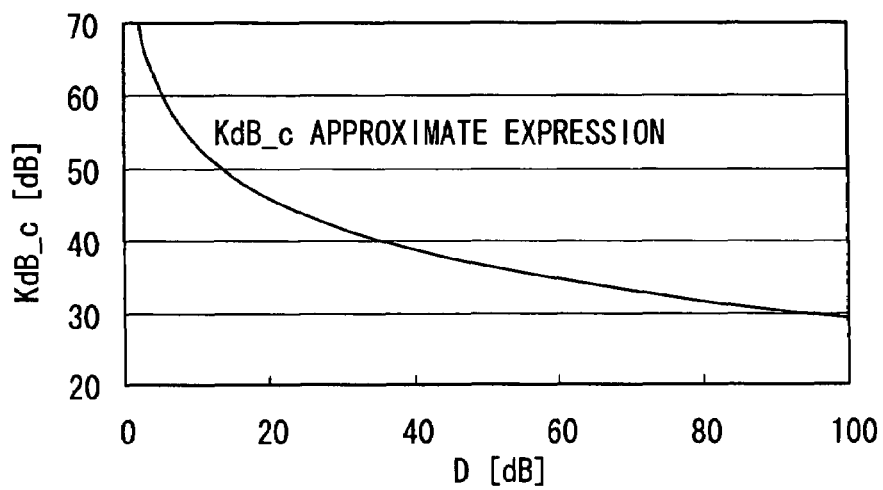
FIG. 9 is a graph showing a characteristic feature of an approximate expression given by a formula 18, according to the third modification.

FIG. 8 shows the corrected value "KdB_c" for the index "KdB" of evaluating the vehicle distance change and the vehicle distance "D" to the front vehicle at the timing of starting the braking operation, wherein the corrected values "KdB_c" are obtained from experiments in which a vehicle test driver was instructed to start the braking operation as late as possible but to avoid the crash against the front vehicle. As shown in FIG. 8, the timings for starting the braking operation are distributed on a certain curved line, when the corrected value "KdB_c" (calculated by the formula 17) is used. An approximate expression of the curved line can be expressed by the following formula 18, and the formula 18 has a characteristic feature shown in FIG. 9.

$$KdB\_C = -23.76 \times \log D + 76.96 \quad \text{<Formula 18>}$$

Figure 10:
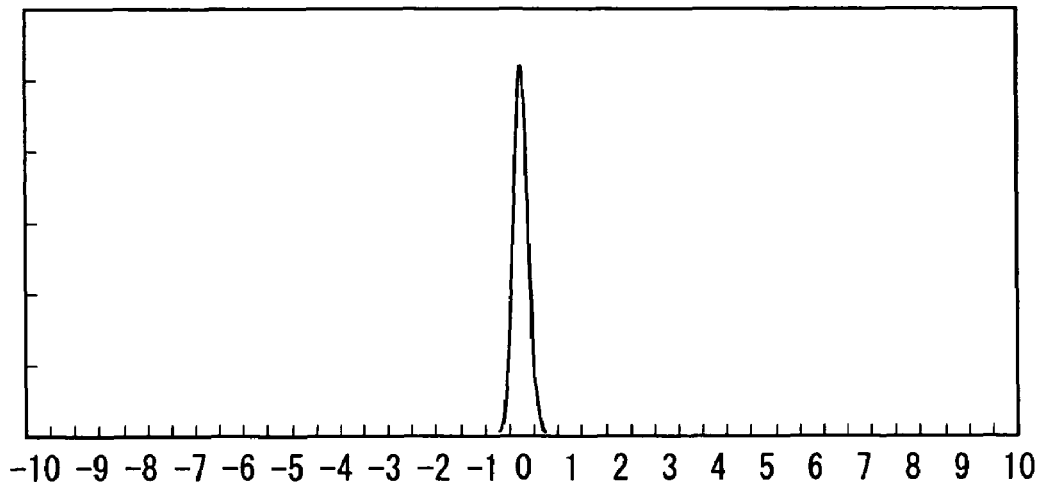
FIG. 10 is a graph, according to the third modification, showing a distribution of differences between the formula 18, which is obtained from the starting points of the braking operation by the test driver, and the corrected value "KdB_c" at the actual starting points of the braking operation.

FIG. 10 shows a distribution of differences between the formula 18, which is obtained from the starting points of the braking operation by the test driver, and the corrected value "KdB_c" at the actual starting time of the braking operation. As explained above, the vehicle test driver was instructed to start the braking operation as late as possible, while he should avoid the crash against the front vehicle. The differences are distributed in a small range (A distribution curve has a sharp peak). Therefore, the approximate expression of the formula 18 is considered as being possible to use as a threshold value for determining the starting timing of the braking operation.

Figure 11:
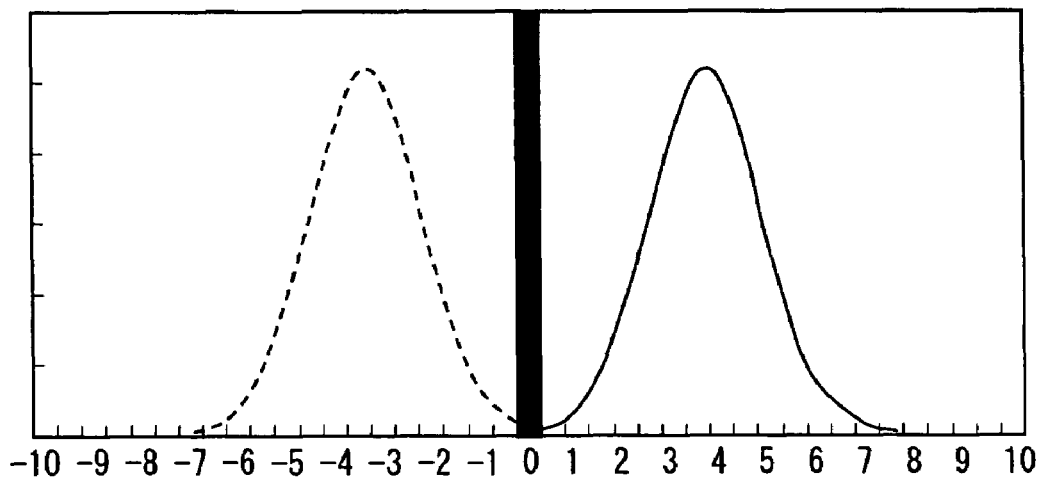
FIG. 11 is a graph, according to the third modification, showing a distribution of differences between the approximate expression of the formula 18 and the corrected values "KdB_c" at the starting points of the braking operation in the normal running of the vehicle, and a distribution of differences between the approximate expression of the formula 18 and the corrected values "KdB_c" at such starting points at which the vehicle drivers recognized the risk, wherein those corrected values "KdB_c" ara collected from actual accident (rear end collision) data.

FIG. 11 shows a distribution (indicated by a dotted line) of differences between the approximate expression of the formula 18 and the corrected values "KdB_c" at the starting timings of the braking operation in the normal running of the vehicle. FIG. 11 further shows a distribution (indicated by a solid line) of differences between the approximate expression of the formula 18 and the corrected values "KdB_c" at such timings at which the vehicle driver recognized the risk. Those timings are collected and obtained from accident data for the rear end collisions.

As understood from FIG. 11, in most cases of ordinary vehicle drivers, the control operation to the braking operation will be started at a timing of such a range out of the normal starting timings for the braking operation, in the case that the brake control operation for suppressing the rear end collisions is carried out at such timings which are decided based on the threshold values obtained from the approximate expression of the formula 18. The formula 18 is obtained from the starting points of the braking operations in the experiments by the vehicle test driver. Accordingly, the starting point (timing) of the control operation to the braking operation does not come into the range for the rear end collisions.

As above, according to the third modification, the corrected value "KdB_c" for the index "KdB" of evaluating the vehicle distance change is calculated, wherein the vehicle speed of the front vehicle is taken into consideration. Then, the starting point (timing) for the braking operation is decided based on the corrected value "KdB_c". As a result, the timing for starting the control operation to the braking force (that is, the starting point for the vehicle deceleration=the starting point for the braking operation) may match the degree of risk, which the vehicle driver feels.

Figure 12:
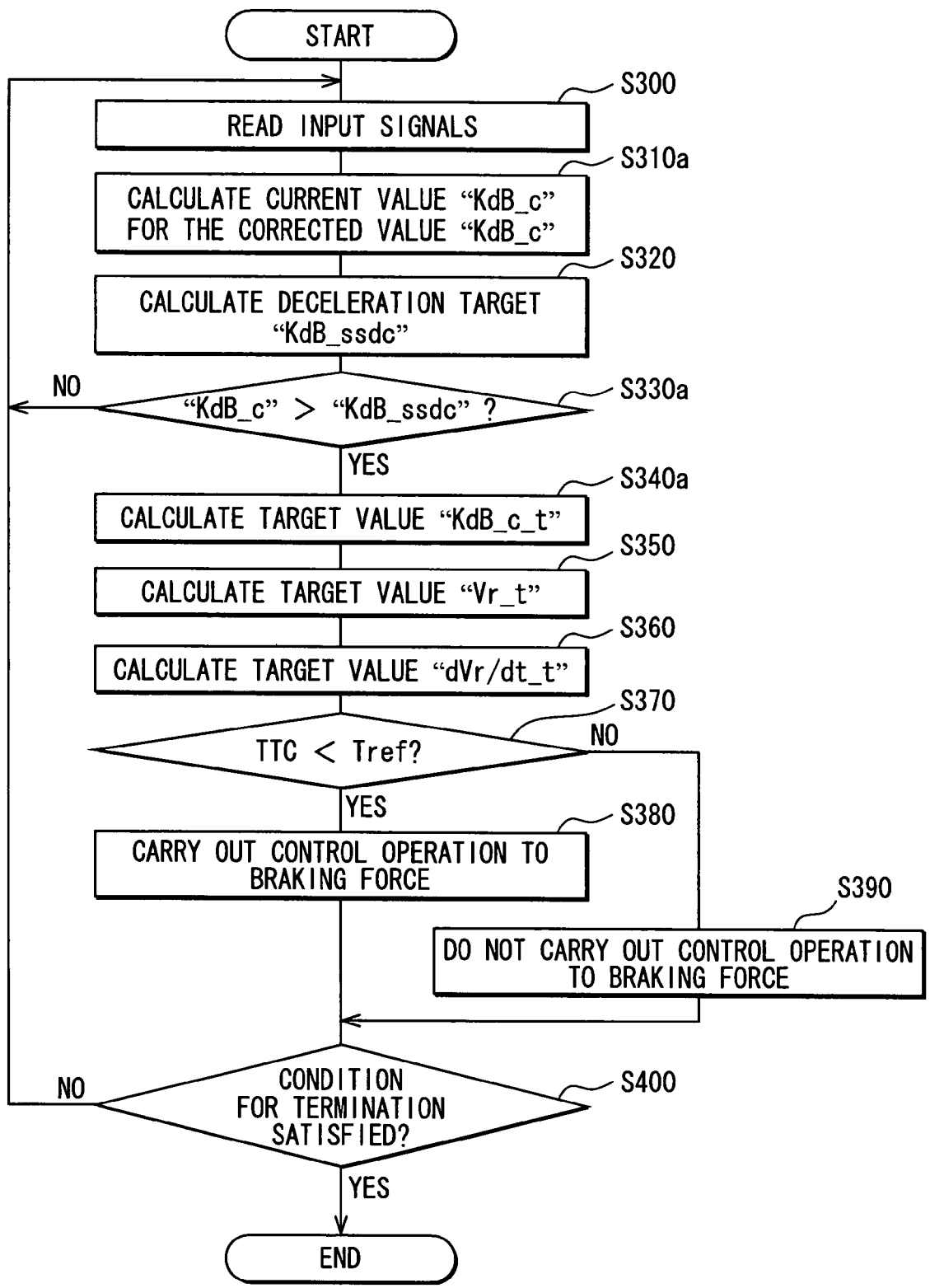
FIG. 12 is a flowchart for a braking force control according to the third modification.

An operation of the braking control according to the third modification, which is performed by the ECU 60, will be explained with reference to the flowchart shown in FIG. 12. The steps S300, S320, and S350 to S400 of the flowchart shown in FIG. 12 are the same to those of the flowchart shown in FIG. 6. Hereinafter, those steps different from FIG. 6 will be mainly explained.

At the step S300, the ECU 60 reads the input signals from the various sensors and switches 10 to 50. At a step S310*a*, the ECU 60 calculates a current value for the corrected value "KdB_c".

More exactly, the current value "KdB_c" for the corrected value "KdB_c" is calculated by substituting the vehicle distance "D" to the front vehicle, which is detected by the radar device 10, into the formula 18.

At the step S320, as in the same manner to FIG. 6, the ECU 60 calculates the deceleration target "KdB_ssdc", which is the index indicating the timing for carrying out the control operation to the braking force of the brake control device, based on the normal deceleration "nd" of the vehicle, the vehicle distance "D" between the driver's vehicle and the front vehicle, and the actual relative vehicle speed "Vr".

At a step S330*a* of FIG. 12, the ECU 60 determines whether the current value "KdB_c" of the corrected value "KdB_c" for the index "KdB" of evaluating the vehicle distance change is larger than the deceleration target "KdB_ssdc". In the case that the current value "KdB_c" is larger than the deceleration target "KdB_ssdc", the process goes to a step S340*a* in order to start the control operation for the braking force. On the other hand, when the current value "KdB_c" is smaller than the deceleration target "KdB_ssdc", the process goes back to the step S300 to repeat the above steps S300 to S330*a*.

At the step S340*a*, a target value "KdB_c_t" of the corrected value "KdB_c" for the index "KdB" of evaluating the vehicle distance change is calculated. The method for calculating the target value "KdB_c_t" is the same to that in the first embodiment, which is explained with reference to FIG. 4. Namely, according to the step S340*a*, the target value "KdB_c_t" of the corrected value "KdB_c" is set such that the target value "KdB_c_t" is increased with a constant gradient as the distance to the front vehicle becomes shorter. Accordingly, the vehicle can be decelerated in such a manner that the decreasing ratio of the relative vehicle speed "Vr" to the front vehicle is made larger as the vehicle distance "D" to the front vehicle becomes shorter.

At the step S350, the target value "Vr_t" of the relative vehicle speed is calculated by the following formula 19, wherein the target value "KdB_c_t" calculated in the step S340*a* is used.

$$Vr\_t = -\tfrac{1}{2} \times 10^{(KdB\_c\_t/10)} \times D^3 \times 5 \times 10^{-8} \qquad \text{<Formula 19>}$$

At the step S360, the target value "dVr/dt_t" for the relative vehicle deceleration is calculated by the following formula 20, wherein the current value "Vr_p" of the relative vehicle speed "Vr" and the target value "Vr_t" of the relative vehicle speed are substituted. The current value "Vr_p" of the relative vehicle speed is calculated by performing the differentiation of the current value "Dp" of the vehicle distance between the driver's vehicle and the front vehicle.

$$dVr/dt\_t = (Vr\_p - Vr\_t)/\Delta t \qquad \text{<Formula 21=Formula 16=Formula 8>}$$

As in the same manner to FIG. 6, at the step S370 of FIG. 12, the ECU 60 determines whether the collision tolerable time "TTC" is shorter than the predetermined time "Tref", wherein the collision tolerable time "TTC" is the remaining time until the driver's vehicle may possibly crash against the front vehicle. In the case that the collision tolerable time "TTC" is shorter than the predetermined time "Tref", the process goes on to the step S380. On the other hand, when the collision tolerable time "TTC" is longer than the predetermined time "Tref", the process goes to the step S390.

As is also explained with reference to FIG. 6, in the case that the collision tolerable time "TTC" is longer than the predetermined time "Tref" at the step S370 of FIG. 12, it is regarded that there is a sufficient time for the vehicle driver to avoid the collision against the front vehicle, at the time of the step S330*a* at which the ECU determined that the current value "KdB_p" is larger than the deceleration target "KdB_ssdc". Accordingly, at the step S390, the control operation to the braking operation is not carried out.

At the step S380, the control operation to the braking operation is carried out. Namely, the control operation to the braking operation is carried out, when the collision tolerable time "TTC" (during which the vehicle may not crash against the front vehicle) is shorter than the predetermined time "Tref" and it is not possible to decelerate the vehicle at the target value "dVr/dt_t" for the vehicle relative deceleration.

At the step S400, the ECU 60 determines whether the condition for terminating the control operation to the braking force is satisfied or not. The condition for terminating the process is satisfied, for example, when the driver's vehicle has stopped, when the collision tolerable time "TTC" becomes longer than the predetermined time "Tref" as a result that the front vehicle has accelerated, or when the current value "KdB_c" for the index "KdB" of evaluating the vehicle distance change is decreased to become lower than the target value "KdB_c_t" by a predetermined amount. In the case that the condition for terminating the control operation to the braking force is not satisfied, the process is repeatedly carried out from the step S300.

(Fourth Modification)

According to the fourth modification, the brake control operation is carried out at such timings which are decided based on the threshold values obtained from the approximate expression of the formula 18 (which is obtained from the starting points of the braking operation by the test driver), and the relative vehicle deceleration to the front vehicle is controlled at a target relative deceleration "dVr/dt_ssdc" during the decelerating operation. An operation of the braking control according to the fourth modification, which is performed by the ECU 60, will be explained with reference to the flowchart shown in FIG. 13.

At a step S410, the ECU 60 reads the input signals from the various sensors and switches 10 to 50. At a step S420, the ECU 60 calculates a current value for the corrected value "KdB_c".

At a step S430, the ECU 60 calculates a threshold value "KdB_s" for the corrected value "KdB_c" of the index "KdB" of evaluating the vehicle distance change, based on the approximate expression of the formula 18, which is obtained from the starting points of the braking operation by the test driver.

At a step S440, the ECU 60 determines whether the current value "KdB_c" of the corrected value "KdB_c" for the index "KdB" of evaluating the vehicle distance change is larger than the threshold value "KdB_s". In case of "YES" at the step S440, the process goes to a step S450, whereas in case of "No" at the step S440, the process goes back to the step S410 to repeat the above steps.

At the step S450, the control operation to the braking operation is carried out. At the step S450, the ECU calculates the target relative deceleration "dVr/dt_ssdc", based on the vehicle distance "D", the relative vehicle speed "Vr", and the current value "KdB_c" of the corrected value "KdB_c". The relative vehicle deceleration to the front vehicle is controlled at the target relative deceleration "dVr/dt_ssdc".

The target relative deceleration "dVr/dt_ssdc" can be calculated by the following formula 21, which is a formula for differentiating the formula 17 by time.

$$dVr/dt\_ssdc = (dVr/dD) \times (dD/dt) = 7.5 \times D^2 \times 10^{\{((KdB\_c)/10)-8\}} \times Vr \quad \text{<Formula 21>}$$

The target relative deceleration "dVr/dt_ssdc" indicated by the above formula 21 expresses a target value of the relative vehicle deceleration for keeping the current distance "D" to the front vehicle. Accordingly, it becomes possible to keep the current value "KdB_c" of the corrected value "KdB_c" (in other words, to keep the current vehicle distance "D"), when the vehicle is decelerated to achieve the target relative deceleration "dVr/dt_ssdc".

It is more preferable if the target relative deceleration "dVr/dt_ssdc" is multiplied by a first gain "gain 1", which is a positive figure less than 1.0. The target relative deceleration "dVr/dt_ssdc" multiplied by the first gain "gain 1" is expressed by the following formula 22:

$$dVr/dt\_ssdc = \text{gain1} \times 7.5 \times D^2 \times 10^{\{((KdB\_c)/10)-8\}} \times Vr \quad \text{<Formula 22>}$$

In the case that the figure "1" is given to the "gain 1" of the above formula 22, and the vehicle deceleration is carried out to achieve the target relative deceleration "dVr/dt_ssdc", the current value "KdB_c" of the corrected value "KdB_c" can be kept (in other words, the current vehicle distance "D" can be maintained).

On the other hand, if the positive figure less than "1" is applied to the first gain "gain 1", and the vehicle deceleration is carried out to achieve the target relative deceleration "dVr/dt_ssdc", it would become possible to make the current vehicle distance "D" shorter. A range of the figures for the first gain "gain 1" is disclosed, for example, in Japanese Patent Application No. 2006-5330.

A target relative vehicle speed "Vr_da" may be taken into consideration when the target relative deceleration "dVr/dt_ssdc" may be calculated. A formula for calculating such target relative deceleration "dVr/dt_ssdc" (in case of the first gain: "gain 1"=1.000) is expressed as in the following formula 23, wherein the target relative vehicle speed "Vr_da" is taken into consideration:

$$dVr/dt\_ssdc = 7.5 \times D^2 \times 10^{\{((KdB\_c)/10)-8\}} \times (Vr - Vr\_da) \quad \text{<Formula 23>}$$

In the case that the target relative vehicle speed "Vr_da" is zero, and the vehicle deceleration is carried out to achieve the target relative deceleration "dVr/dt_ssdc", the current value "KdB_c" of the corrected value "KdB_c" can be kept.

On the other hand, if the target relative vehicle speed "Vr_da" is a negative figure ("Vr_da"<0), the target relative deceleration "dVr/dt_ssdc" becomes smaller than that in case of "Vr_da"=0. When the vehicle deceleration is carried out to achieve the target relative deceleration "dVr/dt_ssdc", under the above situation ("Vr_da"<0), the vehicle can be decelerated that the relative vehicle speed is decreased from the current relative vehicle speed "Vr" to the target relative vehicle speed "Vr_da".

Furthermore, in the case that the target relative vehicle speed "Vr_da" is a positive figure ("Vr_da">0), the target relative deceleration "dVr/dt_ssdc" becomes larger than that in case of "Vr_da"=0. When the vehicle deceleration is carried out to achieve the target relative deceleration "dVr/dt_ssdc", under the above situation ("Vr_da">0), the vehicle can be decelerated that the relative vehicle speed is decreased from the current relative vehicle speed "Vr" to the target relative vehicle speed "Vr_da".

In addition, it is also possible at the step S450 that the target relative deceleration "dVr/dt_ssdc" is multiplied by a second gain "gain 2", which is a positive figure less than 1.0 and which is decided by the vehicle speed of the front vehicle. Namely, the degree of risk for the vehicle becomes higher as the vehicle speed of the front vehicle is higher, in particular when the front vehicle is rapidly decelerated. It is tendency that the vehicle driver decelerates the vehicle with a higher deceleration, as the vehicle speed of the front vehicle is higher. Accordingly, it is preferable to obtain the target relative deceleration "dVr/dt_ssdc", which is multiplied by the second gain "gain 2" in addition to the first gain "gain 1", as shown in the following formula 24:

$$dVrdt\_ssdc = \text{gain2} \times \{\text{gain1} \times 7.5 \times D^2 \times 10^{\{((KdB\_p)/10)-8\}} \times (Vr - Vr\_da)\} \quad \text{<Formula 24>}$$

In the above formula 24, the figure for the second gain "gain 2" may be selected, for example, as 0.5 in case of the vehicle speed of the front vehicle being less than 50 km/h ("Vb"<50 km/h), and 1.0 in case of the vehicle speed of the front vehicle being higher than 50 km/h ("Vb">50 km/h). Then, it becomes possible to make the target relative deceleration "dVrdt_ssdc" to match the deceleration generated by the braking operation carried out by the vehicle driver.

At a step S460, the ECU 60 determines whether a condition for terminating the control operation to the braking force is satisfied or not. The condition for terminating the process is satisfied, for example, when the driver's vehicle has stopped, or when the current value "KdB_c" for the corrected value "KdB_c" of the index "KdB" of evaluating the vehicle distance change becomes lower than the threshold value "KdB_s". In the case that the condition for terminating the control operation to the braking force is not satisfied, the process is repeatedly carried out from the step S410.

According to the fourth modification as explained above, the control operation for decelerating the vehicle is started when the corrected value "KdB_c" of the index "KdB" of evaluating the vehicle distance change becomes larger than the threshold value "KdB_s". As a result, the timing for starting the control operation to the braking force (that is, the starting point for the vehicle deceleration=the starting point for the braking operation) may match the degree of risk, which the vehicle driver feels.

(Fifth Modification)

In the third modification, the target value "dVr/dt_t" for the relative vehicle deceleration is calculated by the formula 20 (at the step S360 of FIG. 12), wherein the current value "Vr_p" of the relative vehicle speed "Vr" and the target value "Vr_t" of the relative vehicle speed are substituted. The target value "Vr_t" of the relative vehicle speed is calculated by the formula 19 (at the step S350 of FIG. 12), wherein the target value "KdB_c_t" for the corrected value "KdB_c" of evaluating the vehicle distance change is used.

Figure 14:
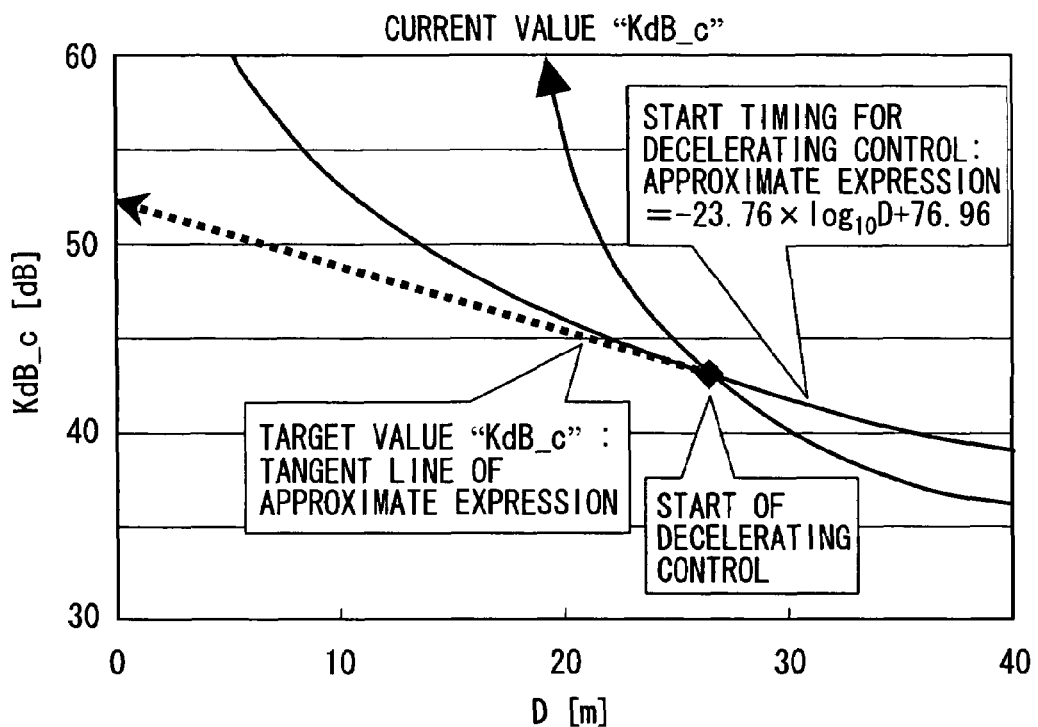
FIG. 14 is a graph explaining a method for calculating a target value "KdB_c_t" of the corrected value "KdB_t" of the index "KdB" for evaluating the vehicle distance change, according to a fifth modification.

According to a fifth modification (FIG. 14), the above target value "KdB_c_t" for the corrected value "KdB_c" of evaluating the vehicle distance change is alternatively calculated in the following manner.

Figure 13:
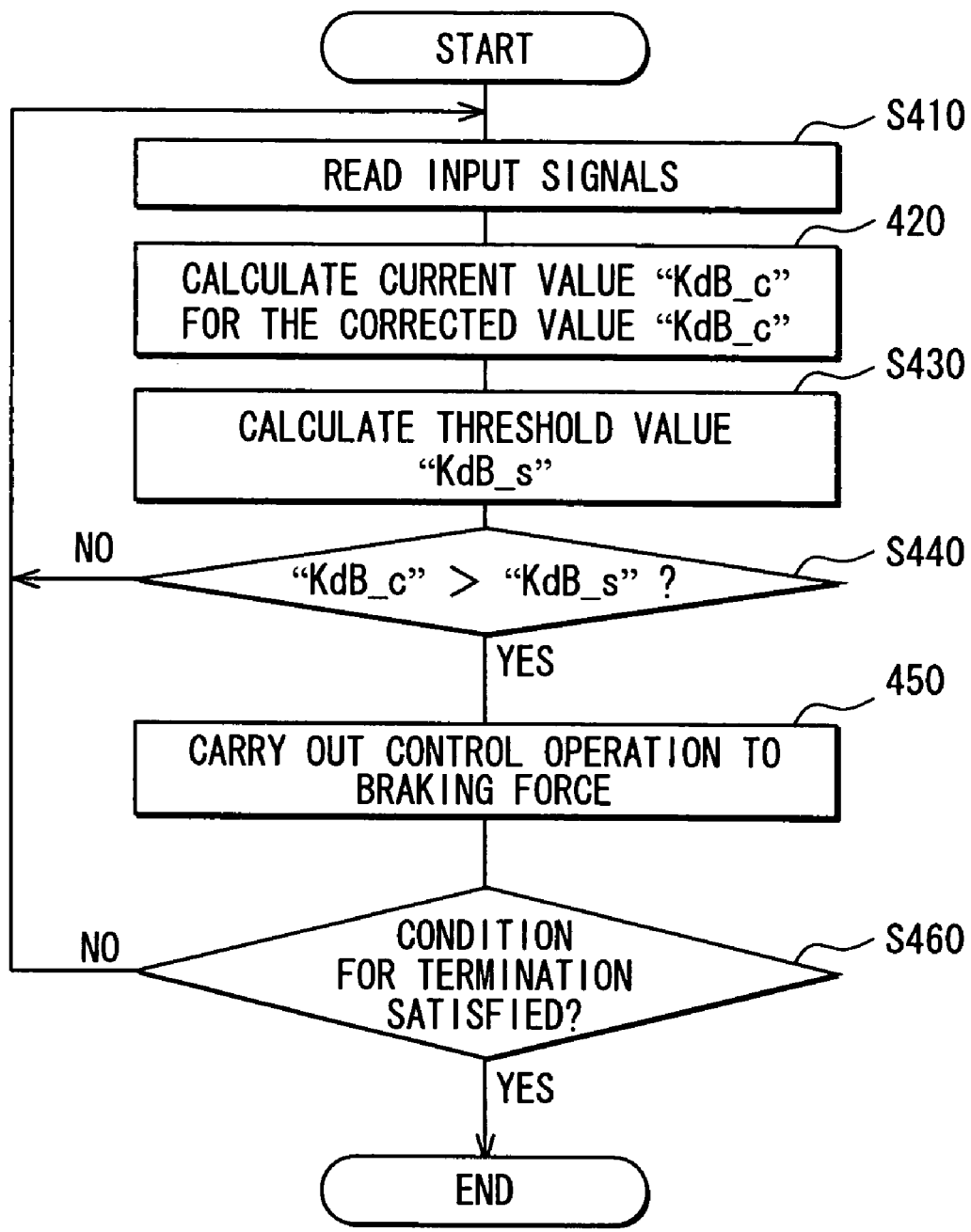
FIG. 13 is a flowchart for a braking force control according to a fourth modification.

At first, the steps S410 to S440 of FIG. 13 are the same for the fifth modification. At the step S440, therefore, the ECU determines that the current value "KdB_c" for evaluating the vehicle distance change is larger than the threshold value "KdB_s". A tangent line (a dotted line in FIG. 14) is obtained, which is a tangent line of the approximate expression for the corrected index "KdB_c" of evaluating the vehicle distance change at such a timing, at which the current value "KdB_c" (calculated by the formula 17) for evaluating the vehicle distance change is determined as being larger than the threshold value "KdB_s" (calculated by the formula 18), that is at the timing at which the braking operation has been started. The above tangent line is used as the target value "KdB_c_t" for the corrected value "KdB_c" of evaluating the vehicle distance change.

As a result, the timing for starting the control operation to the braking force may match a degree of risk, which the vehicle driver feels.

(Sixth Modification)

Figure 15:
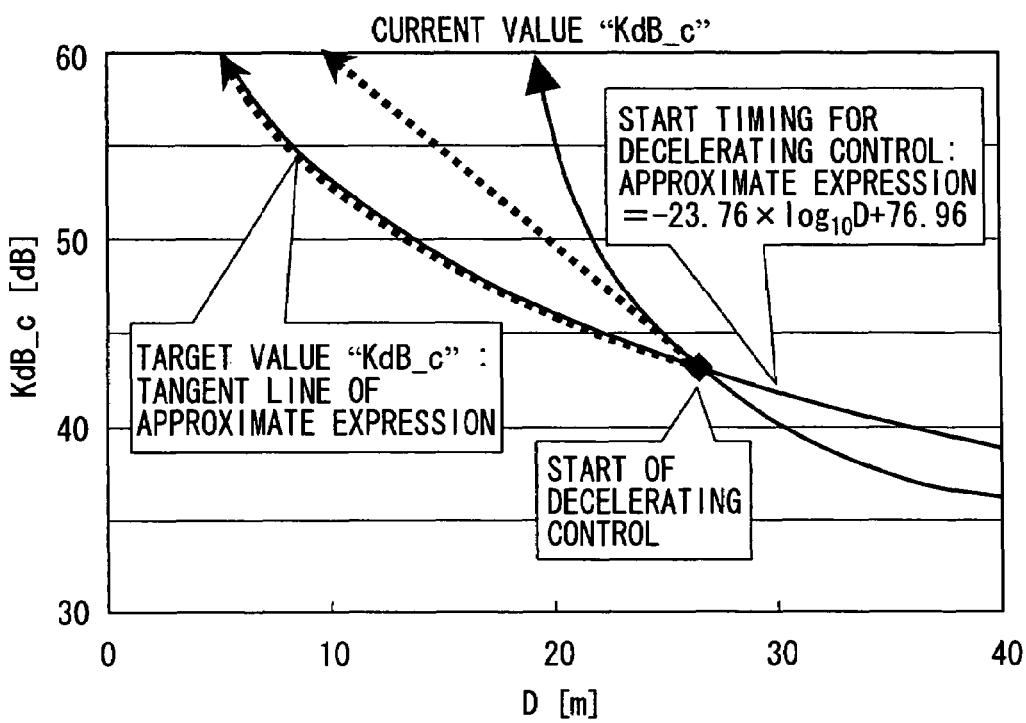
FIG. 15 is a graph explaining a method for calculating a target value "KdB_c_t" of the corrected value "KdB_t" of the index "KdB" for evaluating the vehicle distance change, according to a sixth modification.

Furthermore, the above target value "KdB_c_t" for the corrected value "KdB_c" of evaluating the vehicle distance change may be alternatively calculated in the following manner, as in the sixth modification shown in FIG. 15.

At first, the steps S410 to S440 of FIG. 13 are also the same for the sixth modification. At the step S440, therefore, the ECU determines that the current value "KdB_c" (calculated by the formula 17) for evaluating the vehicle distance change is larger than the threshold value "KdB_s" (calculated by the formula 18). Then, each value (indicated by a dotted line in FIG. 15) of the approximate expression for the corrected index "KdB_c" of evaluating the vehicle distance may be used as the target value "KdB_c_t" for the corrected value "KdB_c" of evaluating the vehicle distance change.

As a result, the timing for starting the control operation to the braking force may match a degree of risk, which the vehicle driver feels.

What is claimed is:

1. A brake control system for a vehicle comprising:
    a braking device for applying braking force to respective vehicle wheels;
    a distance detecting device mounted in a vehicle for detecting a vehicle distance between the vehicle and a front obstacle; and
    an electronic control unit for controlling a braking operation by the braking device for the vehicle in accordance with input signals from various kinds of sensors, including the distance detecting device,
    wherein the electronic control unit comprises:
    a detecting portion for detecting a relative vehicle speed of the vehicle to the front obstacle;
    a first calculating portion for calculating an index for evaluating a change of the vehicle distance, the index indicating a condition of the vehicle distance to the front obstacle, the index being increased as the relative vehicle speed becomes larger, and the index having an increasing gradient which is increased as the vehicle distance to the front obstacle becomes shorter in each of the relative vehicle speed,
    a setting portion for setting a target value for the index, which is plotted on a line having an initial value corresponding to the index at a stating point of a braking operation carried out by a vehicle driver, the target value being increased as the vehicle distance to the front obstacle becomes shorter, with a constant gradient which is decided based on the index at the stating point of the braking operation;
    a second calculating portion for calculating a target value of a relative vehicle deceleration, based an actual current value of the relative vehicle speed and a target value of the relative vehicle speed, wherein the target value of the relative vehicle speed is calculated from the target value for the index; and
    a control portion for carrying out a brake assisting control to the braking force generated by the braking device such that an actual relative vehicle deceleration is controlled at the target value of the relative vehicle deceleration.

2. A brake control system for a vehicle according to claim 1, wherein the electronic control unit further comprises:
    a presuming portion for presuming a relative vehicle deceleration which is generated by the braking operation carried out by the vehicle driver,
    wherein the control portion stops the brake assisting control to the braking force generated by the braking device, when the presumed value of the relative vehicle deceleration is larger than the target value of the relative vehicle deceleration.

3. A brake control system for a vehicle comprising:
    a braking device for applying braking force to respective vehicle wheels;
    a distance detecting device mounted in a vehicle for detecting a vehicle distance between the vehicle and a front obstacle; and
    an electronic control unit for controlling a braking operation by the braking device for the vehicle in accordance with input signals from various kinds of sensors, including the distance detecting device,
    wherein the electronic control unit comprises:
    a detecting portion for detecting a relative vehicle speed of the vehicle to the front obstacle;
    a first calculating portion for calculating an index for evaluating a change of the vehicle distance, the index indicating a condition of the vehicle distance to the front obstacle, the index being increased as the relative vehicle speed becomes larger, and the index having an increasing gradient which is increased as the vehicle distance to the front obstacle becomes shorter in each of the relative vehicle speed,
    a target calculating portion for calculating a deceleration target based on a normal deceleration of the vehicle, the vehicle distance to the front obstacle, and the actual relative vehicle speed detected by the detecting portion, the deceleration target being an index indicating a starting timing for carrying out the control operation to the braking force by the braking device;
    a determining portion for determining whether a current value of the index for evaluating the change of the vehicle distance calculated by the first calculating portion is larger than the deceleration target calculated by the target calculating portion;
    a setting portion for setting a target value for the index for evaluating the change of the vehicle distance, which is plotted on a line having an initial value corresponding to the index at such a timing at which the current value of the index for evaluating the change of the vehicle distance is determined as being higher than the deceleration target, and the target value being increased as the vehicle distance to the front obstacle becomes shorter, with a constant gradient which is decided based on the index at the timing at which the current value of the index for evaluating the change of the vehicle distance is determined as being higher than the deceleration target;

a second calculating portion for calculating a target value of a relative vehicle deceleration, based an actual current value of the relative vehicle speed and a target value of the relative vehicle speed, wherein the target value of the relative vehicle speed is calculated from the target value for the index; and a control portion for carrying out the control operation to the braking force generated by the braking device such that an actual relative vehicle deceleration is controlled at the target value of the relative vehicle deceleration.

4. A brake control system for a vehicle according to claim 3, wherein the first calculating portion calculates a current value of a corrected index for evaluating the change of the vehicle distance, the determining portion determines whether the current value of the corrected index for evaluating the change of the vehicle distance is larger than the deceleration target, the setting portion sets a target value for the corrected index for evaluating the change of the vehicle distance, which is plotted on a line having an initial value corresponding to the corrected index at such a timing at which the current value of the corrected index for evaluating the change of the vehicle distance is determined as being higher than the deceleration target, and the target value being increased as the vehicle distance to the front obstacle becomes shorter, with a constant gradient which is decided based on the corrected index at the timing at which the current value of the corrected index for evaluating the change of the vehicle distance is determined as being higher than the deceleration target, and the second calculating portion calculates the target value of the relative vehicle deceleration, based on the actual current value of the relative vehicle speed and the target value of the relative vehicle speed, wherein the target value of the relative vehicle speed is calculated from the target value for the corrected index.

5. A brake control system for a vehicle according to claim 1, wherein the electronic control unit further comprises;

a third calculating portion for calculating a collision tolerable time, which is a remaining time until the driver's vehicle may possibly crash against the front obstacle, wherein the control portion does not start the brake assisting control, or the brake control, to the braking force generated by the braking device, when the collision tolerable time is larger than a predetermined time.

6. A brake control system for a vehicle according to claim 5, wherein the predetermined time is changed depending on a moving speed of the front obstacle, when the front obstacle is moving.

7. A brake control system for a vehicle according to claim 1, wherein the target value for the index is calculated by multiplying the constant gradient by a gain, which is selected by the vehicle driver.

8. A brake control system for a vehicle comprising:

a braking device for applying braking force to respective vehicle wheels;

a distance detecting device mounted in a vehicle for detecting a vehicle distance between the vehicle and a front obstacle; and an electronic control unit for controlling a braking operation by the braking device for the vehicle in accordance with input signals from various kinds of sensors, including the distance detecting device, wherein the electronic control unit comprises:

a detecting portion for detecting a relative vehicle speed of the vehicle to the front obstacle;

a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed;

a determining portion for determining whether the corrected index of the index for evaluating the change of the vehicle distance is larger than a predetermined threshold value; and a control portion for carrying out a brake control to the braking force generated by the braking device when the corrected index of the index for evaluating the change of the vehicle distance is larger than the predetermined threshold value.

9. A brake control system for a vehicle comprising:

a braking device for applying braking force to respective vehicle wheels;

a distance detecting device mounted in a vehicle for detecting a vehicle distance between the vehicle and a front obstacle; and an electronic control unit for controlling a braking operation by the braking device for the vehicle in accordance with input signals from various kinds of sensors, including the distance detecting device, wherein the electronic control unit comprises:

a detecting portion for detecting a relative vehicle speed of the vehicle to the front obstacle;

a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed;

a determining portion for determining whether the corrected index of the index for evaluating the change of the vehicle distance is larger than a predetermined threshold value;

a setting portion for setting a target value for the corrected index for evaluating the change of the vehicle distance, which is plotted on a line having the predetermined threshold value as an initial value, and the target value being increased as the vehicle distance to the front obstacle becomes shorter, with a constant gradient which is decided based on the corrected index at such a timing at which the corrected index of the index for evaluating the change of the vehicle distance is determined as being larger than the predetermined threshold value;

a second calculating portion for calculating a target value of a relative vehicle deceleration, based an actual current value of the relative vehicle speed and a target value of the relative vehicle speed, wherein the target value of the relative vehicle speed is calculated from the target value of the corrected index; and a control portion for carrying out a brake control to the braking force generated by the braking device such that an actual relative vehicle deceleration is controlled at the target value of the relative vehicle deceleration.

10. A brake control system for a vehicle comprising:

a braking device for applying braking force to respective vehicle wheels;

a distance detecting device mounted in a vehicle for detecting a vehicle distance between the vehicle and a front obstacle; and an electronic control unit for controlling a braking operation by the braking device for the vehicle in accordance with input signals from various kinds of sensors, including the distance detecting device, wherein the electronic control unit comprises:

a detecting portion for detecting a relative vehicle speed of the vehicle to the front obstacle;

a first calculating portion for calculating a corrected value of an index for evaluating a change of the vehicle distance, the corrected index indicating a condition of the vehicle distance to the front obstacle by taking a moving speed of the front obstacle into consideration, the corrected index being increased as the relative vehicle speed becomes larger, and the corrected index having an increasing gradient which is increased as the vehicle distance to the front obstacle becomes shorter in each of the relative vehicle speed;

a determining portion for determining whether the corrected index of the index for evaluating the change of the vehicle distance is larger than a predetermined threshold value;

a setting portion for setting the predetermined threshold value as a target value for the corrected index for evaluating the change of the vehicle distance, when the corrected index of the index for evaluating the change of the vehicle distance is determined as being larger than the predetermined threshold value by the determining portion;

a second calculating portion for calculating a target value of a relative vehicle deceleration, based an actual current value of the relative vehicle speed and a target value of the relative vehicle speed, wherein the target value of the relative vehicle speed is calculated from the target value of the corrected index; and a control portion for carrying out a brake control to the braking force generated by the braking device such that an actual relative vehicle deceleration is controlled at the target value of the relative vehicle deceleration.

* * * * *